(12) United States Patent
Bottom

(10) Patent No.: US 8,838,469 B2
(45) Date of Patent: Sep. 16, 2014

(54) SYSTEM AND METHOD FOR OPTIMIZING DISPLAY SPACE ALLOCATION OF MERCHANDISING USING REGRESSION ANALYSIS TO GENERATE SPACE ELASTICITY CURVES

(75) Inventor: Joseph S. Bottom, Chico, CA (US)

(73) Assignee: Accenture Global Services Limited, Dublin (IE)

( * ) Notice: Subject to any disclaimer, the term of this patent is extended or adjusted under 35 U.S.C. 154(b) by 963 days.

(21) Appl. No.: 12/483,645

(22) Filed: Jun. 12, 2009

(65) Prior Publication Data

US 2010/0318403 A1    Dec. 16, 2010

(51) Int. Cl.
| | | |
|---|---|---|
| G06Q 10/00 | (2012.01) |
| G06F 17/00 | (2006.01) |
| G06N 7/04 | (2006.01) |
| G06Q 30/02 | (2012.01) |
| G06Q 10/06 | (2012.01) |
| G06N 5/02 | (2006.01) |

(52) U.S. Cl.
CPC ............ *G06Q 30/02* (2013.01); *G06Q 30/0204* (2013.01); *G06N 5/02* (2013.01); *G06Q 30/0201* (2013.01); *G06Q 10/0637* (2013.01); *G06Q 30/0202* (2013.01); *G06Q 10/06375* (2013.01)
USPC ....... 705/7.37; 705/7.33; 705/7.29; 705/7.31; 706/54

(58) Field of Classification Search
CPC .......... G06Q 30/0204; G06Q 30/0202; G06Q 30/0201; G06Q 10/06375; G06N 5/02
USPC ................. 705/7.33, 7.31, 7.29, 7.37; 706/54
See application file for complete search history.

(56) References Cited

U.S. PATENT DOCUMENTS

| | | | | |
|---|---|---|---|---|
| 3,705,410 A | * | 12/1972 | Kooy et al. .................... | 705/7.12 |
| 4,885,686 A | * | 12/1989 | Vanderbei ....................... | 700/99 |
| 5,600,555 A | * | 2/1997 | Takahashi et al. ............. | 705/1.1 |
| 6,032,123 A | * | 2/2000 | Jameson ....................... | 705/7.22 |
| 6,035,284 A | * | 3/2000 | Straub et al. .................... | 705/28 |
| 6,219,649 B1 | * | 4/2001 | Jameson ....................... | 705/7.12 |
| 6,341,269 B1 | * | 1/2002 | Dulaney et al. ................. | 705/22 |
| 6,366,890 B1 | * | 4/2002 | Usrey ........................... | 705/7.31 |
| 6,609,101 B1 | * | 8/2003 | Landvater .................... | 705/7.25 |
| 6,810,384 B1 | * | 10/2004 | Cooper ........................ | 705/7.29 |
| 6,834,266 B2 | * | 12/2004 | Kumar et al. ................ | 705/7.29 |

(Continued)

OTHER PUBLICATIONS

Proceedings of the Sawtooth software conference, Oct. 2004.*

(Continued)

*Primary Examiner* — Justin M Pats
*Assistant Examiner* — Octavian Rotaru
(74) *Attorney, Agent, or Firm* — Brinks Gilson & Lione

(57) ABSTRACT

A system uses elasticity modeling to enable cross category optimization of store display space for merchandise for any group of stores and items using point-of-sale data. A space elasticity curve is periodically created for each combination of performance metric, store cluster, planogram, and item segment, and is then scaled by individual store. A user can select any combination of stores and planograms, and the system then reconstructs the elasticity curves as individual "synthetic items," which are averaged across the selected stores by creating average synthetic SKU records that reflect the estimated average store performance in each performance metric. The synthetic items are then used to either evaluate macro space performance across or within store areas, or to determine the best use of overall store display space available to permit management to optimally allocate display space for merchandise.

12 Claims, 20 Drawing Sheets

(56) References Cited

U.S. PATENT DOCUMENTS

| | | | |
|---|---|---|---|
| 6,910,017 B1* | 6/2005 | Woo et al. | 705/7.29 |
| 6,922,706 B1* | 7/2005 | Kurtzberg et al. | 707/767 |
| 7,027,999 B2* | 4/2006 | Smith et al. | 705/7.31 |
| 7,092,929 B1* | 8/2006 | Dvorak et al. | 705/28 |
| 7,133,882 B1* | 11/2006 | Pringle et al. | 707/999.005 |
| 7,155,402 B1* | 12/2006 | Dvorak | 705/14.41 |
| 7,155,424 B2* | 12/2006 | Ikezawa et al. | 707/999.001 |
| 7,398,270 B1* | 7/2008 | Choi et al. | 706/48 |
| 7,437,308 B2* | 10/2008 | Kumar et al. | 705/7.33 |
| 7,523,048 B1* | 4/2009 | Dvorak | 705/7.31 |
| 7,533,037 B1* | 5/2009 | Noble et al. | 705/7.31 |
| 7,653,561 B2* | 1/2010 | Bergstrom | 705/7.22 |
| 7,734,495 B2* | 6/2010 | Klaubauf et al. | 705/7.25 |
| 7,739,143 B1* | 6/2010 | Dwarakanath et al. | 705/7.31 |
| 7,769,625 B2* | 8/2010 | Veit | 705/7.29 |
| 7,885,865 B2* | 2/2011 | Benson et al. | 705/28 |
| 7,949,639 B2* | 5/2011 | Hunt et al. | 707/688 |
| 8,082,170 B2* | 12/2011 | Cereghini et al. | 705/7.31 |
| 2001/0047293 A1* | 11/2001 | Waller et al. | 705/10 |
| 2002/0035537 A1* | 3/2002 | Waller et al. | 705/37 |
| 2002/0072977 A1* | 6/2002 | Hoblit et al. | 705/22 |
| 2002/0147630 A1* | 10/2002 | Rose et al. | 705/10 |
| 2002/0156667 A1* | 10/2002 | Bergstrom | 705/7 |
| 2003/0018503 A1* | 1/2003 | Shulman | 705/7 |
| 2003/0028437 A1* | 2/2003 | Grant et al. | 705/26 |
| 2003/0033217 A1* | 2/2003 | Cutlip | 705/27 |
| 2003/0055712 A1* | 3/2003 | Eltchaninoff et al. | 705/10 |
| 2003/0195791 A1* | 10/2003 | Waller et al. | 705/10 |
| 2003/0229502 A1* | 12/2003 | Woo | 705/1 |
| 2004/0133483 A1* | 7/2004 | Potter et al. | 705/28 |
| 2005/0027621 A1* | 2/2005 | Ramakrishnan | 705/28 |
| 2005/0060270 A1* | 3/2005 | Ramakrishnan | 705/400 |
| 2005/0102272 A1* | 5/2005 | Kumar et al. | 707/2 |
| 2005/0114196 A1* | 5/2005 | Schoenmeyr | 705/10 |
| 2005/0187972 A1* | 8/2005 | Kruger et al. | 707/104.1 |
| 2005/0240469 A1* | 10/2005 | Rose et al. | 705/10 |
| 2006/0161465 A1* | 7/2006 | Ramakrishnan | 705/7 |
| 2006/0190341 A1* | 8/2006 | Riley et al. | 705/26 |
| 2007/0050235 A1* | 3/2007 | Ouimet | 705/10 |
| 2008/0136582 A1* | 6/2008 | Kruger et al. | 340/5.1 |
| 2008/0208719 A1* | 8/2008 | Sharma et al. | 705/29 |
| 2008/0288327 A1* | 11/2008 | Watarai et al. | 705/10 |
| 2010/0217681 A1* | 8/2010 | Geikie et al. | 705/26 |

OTHER PUBLICATIONS

Ryzin et al, On the Relationship between inventory costs and variety benefits in retail assortments, Management Science, 45,11 ABI-Inform Global p. 1496, Nov. 1999.* von Stein, Martin, Wordpress, category management part1, 2007 http://kam2007.files.wordpress.com/2007/06/martin-vom-stein__kam2__gc__ingles__1parte1.pdf.* von Stein, Martin, Wordpress, category management part2, 2007 http://kam2007.files.wordpress.com/2007/06/martin-vom-stein__kam2__gc__ingles__2parte.pdf.*

Walkenbach, John, Microsoft Excel 2003 Bible, ISBN 0-7645-3967-1, Wiley Publishing, 2003 (selection).*

Leventhal Barry, Beyond the Customer—How to Expand the Scope of Advanced Analytics, Advanced Analytics Workshop, Apr. 25, 2007.*

Walkenbach, John, Microsoft Excel 2003 Bible, ISBN 0-7645-3967-1, Wiley Publishing, 2003.*

Keogh et al, An enhanced representation of time series which allows fast and accurate classification, clustering and relevance feedback, CiteSeer, 1998.*

Anagerer Alfred, The Impact of Automatic Store Replenishment systems on retail, dissertation No. 3123, University of St Gallen, Austria 2005.*

Bai Ruibin, An Investigation of novel approaches for optimizing retail shelf space allocation, University of Nottingham, UK, Sep. 2005.*

Belloni et al, Optimizing product line designs—efficient methods and comparisons, v 54, n9, pp. 1544-1552, ISSN 0025-1909, Management Science, Informs, Jul. 2008.*

Bezawada et al, Cross category effects of aisle and display placements—a spatial modeling approach and insights, Purdue University dissertation, Aug. 2008.*

Cachon, Retail Assortment Planning in the presence of soncumer search, MSOM, v7, n4, p. 330-346, ISSN 1523-4614, Informs 2005.*

Chong et al, A modeling framework for catetory assortment planning, UCLA James Peters Research and SMU Research Center, Sep. 2001.*

Churhan Ronald C, The Relationship between shelf space and unit sales in supermarkets, Journal of Marketing Research, 9, 000004, ABI-Inform Global p. 406, Nov. 1972.*

Desmet et al, Estimation of product category sales responsivness to allocated shelf price, Elsevier, International J of Research Marketing, 15, 443-457, 1998.*

Donselaar et al, Ordering behavior in retail stores and implications for automated replenishment, Eindhoven University, Netherlends, Nov. 2007.*

Gaur et al, Assortment Planning and Inventory Decisions under a locational choice model, Department of Information, Operations and Management , NYU, 2005.*

Green et al, A simple heuristic for selecting good products in conjoint analysis, Applications of Management Science, v5, pp. 131-153, ISBN 0-89232-687-5, JAI Press Inc, 1987.*

Green et al, An application of a product positioning model to pharmaceutical products, Marketing Science, v 11, n2, USA, Spring 1992.*

Gruen, Thomas W, Acomprehensive guide to retail out of stock reduction in a fast moving consumer goods industry ISBN 978-3-905613-04-9, Procter and Gamble, 2007.*

Guadagni et al, A logit model of brand choice calibrated on scanner data, Marketing Science, 27, 1 p. 29, ABI-Inform, Informs, Jan.-Feb. 2008.*

Guadagni et al, When and what to buy—a nested logit model of coffee purchase, CCC 0277-6693-98-030303-24, Wiley publishing, 1998.*

Kok et al, Demand Estimation and assortment optimization under substitution Operations Research, v 55, n6, p. 1001-1021, ISSN 0030-364x, informs, Nov.-Dec. 2007.*

Kok et al, Review of literature and industry practice, Retail Supply Chain Management Edition, Nov. 2006.*

Leventhal Barry, Beyound the Customer—How to Expand the Scope of Advanced Analytics, Advanced Analytics Workshop, Teradata, Apr. 25, 2007.*

Maddah et al, Joint pricing, assortment, and inventory decisions for retailer product line, Wiley InterScience, Jan. 2007.*

Mahajan et al , Stocking Retail Assortments under dynamic consumer behavior, Operations Research, 49, 3, p. 334, ABI-Inform Global, May-Jun. 2001.*

Ryzin et al, On the Relationship between inventory costs and variety benefits in retail assortments, Management Science, 45,1 1 ABI-Inform Global p. 1496, Nov. 1999.*

Smith et al, Management of multi-item retail inventory systems with demand substitution, Operations Research, 48,1, ABI-Inform Global, p. 50, Operations Research, Jan.-Feb. 2000.*

Subrahmanyan et al, Developing Optimal Pricing and Inventory Policies for Retailers Who Face Uncertain Demand, J of Retailing, V72, N1, pp. 7-30, ISSN00224359, 1996.*

Usman Khalid, Determination of Drivers of Stock-out performance of retail stores using data mining techniques, MIT, May 2008.*

Zentes et al, Strategic Retail Management, ISBN 978-3-8349-0287-0, Gabler, 2007 (selection).*

* cited by examiner

The first step in creating Synthetic SKUs is to determine the LFF / SKU for each Store / POG / Class combo in the store. This is done by dividing the Actual LFF by Number of SKUs for the class on the planogram.

| Store | POG | Class | Actual LFF | Number of SKUs | LFF/SKU |
|---|---|---|---|---|---|
| Store 1 | Radios | Class X | 10.00 | 30 | 0.33 |
| Store 1 | Cameras | Class A | 5.00 | 10 | 0.50 |
| Store 1 | Cameras | Class B | 15.00 | 20 | 0.75 |
| Store 2 | Radios | Class X | 15.00 | 40 | 0.38 |
| Store 2 | Cameras | Class A | 20.00 | 35 | 0.57 |
| Store 2 | Cameras | Class B | 25.00 | 30 | 0.83 |
| Store 3 | Radios | Class X | 10.00 | 25 | 0.40 |
| Store 3 | Cameras | Class A | 5.00 | 5 | 1.00 |
| Store 3 | Cameras | Class B | 15.00 | 35 | 0.43 |

Once this is complete, the Average LFF / SKU across all stores in the project is calculated for each POG / Class combo.

| Store | POG | Class | Average Number Of SKUs | Average LFF/SKU |
|---|---|---|---|---|
| Stores 1,2,3 | Radios | Class X | 31.67 | 0.37 |
| Stores 1,2,3 | Cameras | Class A | 16.67 | 0.69 |
| Stores 1,2,3 | Cameras | Class B | 28.33 | 0.67 |

Figure 10

The preceding calculation is carried out for all the stores in the project (in this case 3) and the average sales across stores for each SKU and LFF value is calculated. These are the predicted sales values that will be used for this particular project in store performance optimizer.

| LFF | SKU | Store 1 | Store 2 | Store 3 | Average |
|---|---|---|---|---|---|
| 0 | 1 | 0.00 | 0.00 | 0.00 | 0.00 |
| 0.37 | 2 | 37.02 | 38.44 | 33.13 | 36.20 |
| 0.74 | 3 | 73.84 | 76.68 | 66.08 | 72.20 |
| 1.11 | 4 | 110.27 | 114.50 | 98.68 | 107.81 |
| 1.48 | 5 | 146.10 | 151.71 | 130.75 | 142.85 |
| 1.85 | 6 | 181.17 | 188.12 | 162.13 | 177.14 |
| 2.22 | 7 | 215.30 | 223.56 | 192.67 | 210.51 |
| 2.59 | 8 | 248.33 | 257.86 | 222.23 | 242.81 |
| 2.96 | 9 | 280.13 | 290.88 | 250.69 | 273.90 |
| 3.33 | 10 | 310.59 | 322.50 | 277.94 | 303.68 |
| 3.7 | 11 | 339.58 | 352.61 | 303.89 | 332.03 |
| 4.07 | 12 | 367.05 | 381.14 | 328.47 | 358.89 |
| 4.44 | 13 | 392.93 | 408.00 | 351.63 | 384.19 |
| 4.81 | 14 | 417.17 | 433.18 | 373.32 | 407.89 |
| 5.18 | 15 | 439.76 | 456.64 | 393.54 | 429.98 |
| 5.55 | 16 | 460.70 | 478.38 | 412.28 | 450.45 |
| 5.92 | 17 | 480.00 | 498.42 | 429.55 | 469.33 |
| 6.29 | 18 | 497.70 | 516.80 | 445.39 | 486.63 |
| 6.66 | 19 | 513.84 | 533.55 | 459.83 | 502.41 |
| 7.03 | 20 | 528.47 | 548.75 | 472.92 | 516.71 |

Figure 12

The preceding calculations are carried out for all metrics and averages across all three stores are calculated.

Predicted Values for Radios Class X Across Stores 1, 2, and 3

| LFF | SKU | Sales | Units | GM | AGM | CM |
|---|---|---|---|---|---|---|
| 0 | 0 | 0.00 | 0.00 | 0.00 | 0.00 | 0.00 |
| 0.37 | 1 | 36.20 | 4.01 | 8.33 | 8.16 | 7.10 |
| 0.74 | 2 | 36.00 | 3.99 | 8.28 | 8.11 | 7.06 |
| 1.11 | 3 | 35.61 | 3.95 | 8.19 | 8.03 | 6.98 |
| 1.48 | 4 | 35.04 | 3.88 | 8.06 | 7.90 | 6.87 |
| 1.85 | 5 | 34.29 | 3.80 | 7.89 | 7.73 | 6.72 |
| 2.22 | 6 | 33.37 | 3.70 | 7.67 | 7.52 | 6.54 |
| 2.59 | 7 | 32.30 | 3.58 | 7.43 | 7.28 | 6.33 |
| 2.96 | 8 | 31.09 | 3.44 | 7.15 | 7.01 | 6.10 |
| 3.33 | 9 | 29.77 | 3.30 | 6.85 | 6.71 | 5.84 |
| 3.70 | 10 | 28.35 | 3.14 | 6.52 | 6.39 | 5.56 |
| 4.07 | 11 | 26.86 | 2.98 | 6.18 | 6.05 | 5.27 |
| 4.44 | 12 | 25.30 | 2.80 | 5.82 | 5.70 | 4.96 |
| 4.81 | 13 | 23.70 | 2.63 | 5.45 | 5.34 | 4.65 |
| 5.18 | 14 | 22.09 | 2.45 | 5.08 | 4.98 | 4.33 |
| 5.55 | 15 | 20.47 | 2.27 | 4.71 | 4.61 | 4.01 |
| 5.92 | 16 | 18.87 | 2.09 | 4.34 | 4.25 | 3.70 |
| 6.29 | 17 | 17.30 | 1.92 | 3.98 | 3.90 | 3.39 |
| 6.66 | 18 | 15.78 | 1.75 | 3.63 | 3.56 | 3.09 |
| 7.03 | 19 | 14.31 | 1.59 | 3.29 | 3.23 | 2.81 |
| 7.40 | 20 | 12.91 | 1.43 | 2.97 | 2.91 | 2.53 |

Figure 14

The process is repeated for each store / POG / class combination in the study. The predicted metrics are calculated unit either the max LFF increase designated by the user for that POG is reached or if there is no max, the predictions go until system default limits the current average LFF. In this example, Radios has a max LFF of 3 feet and Cameras has a max LFF of 5 feet.

| POG | Class | LFF | SKU | Sales | Units |
|---|---|---|---|---|---|
| Cameras | Class A | 0 | 0 | 0.00 | 0.00 |
| Cameras | Class A | 0.69 | 1 | 87.65 | 14.61 |
| Cameras | Class A | 0.69 | 2 | 86.54 | 14.42 |
| Cameras | Class A | 0.69 | 3 | 85.34 | 14.22 |
| Cameras | Class A | 0.69 | 4 | 84.29 | 14.05 |
| Cameras | Class A | 0.69 | 5 | 83.56 | 13.93 |
| Cameras | Class A | 0.69 | 6 | 81.95 | 13.66 |
| Cameras | Class A | 0.69 | 7 | 80.68 | 13.45 |
| Cameras | Class B | 0.00 | 0 | 0.00 | 0.00 |
| Cameras | Class B | 0.67 | 1 | 78.23 | 1.43 |
| Cameras | Class B | 0.67 | 2 | 67.34 | 6.73 |
| Cameras | Class B | 0.67 | 3 | 56.43 | 5.64 |
| Cameras | Class B | 0.67 | 4 | 45.23 | 4.52 |
| Cameras | Class B | 0.67 | 5 | 34.54 | 3.45 |
| Cameras | Class B | 0.67 | 6 | 23.32 | 2.33 |
| Cameras | Class B | 0.67 | 7 | 12.32 | 1.23 |
| Radios | Class X | 0 | 0 | 0.00 | 0.00 |
| Radios | Class X | 0.37 | 1 | 36.20 | 4.01 |
| Radios | Class X | 0.37 | 2 | 36.00 | 3.99 |
| Radios | Class X | 0.37 | 3 | 35.61 | 3.95 |
| Radios | Class X | 0.37 | 4 | 35.04 | 3.88 |
| Radios | Class X | 0.37 | 5 | 34.29 | 3.80 |
| Radios | Class X | 0.37 | 6 | 33.37 | 3.70 |
| Radios | Class X | 0.37 | 7 | 32.30 | 3.58 |
| Radios | Class X | 0.37 | 8 | 31.09 | 3.44 |

Figure 15A

The process is repeated for each store / POG / class combination in the study.
The predicted metrics are calculated unit either the max LFF increase designated
by the user for that POG is reached or if there is no max, the predictions go until
system default limits the current average LFF. In this example, Radios
has a max LFF of 3 feet and Cameras has a max LFF of 5 feet.

| POG | Class | GM | AGM | CM | VPC |
|---|---|---|---|---|---|
| Cameras | Class A | 0.00 | 0.00 | 0.00 | 0.00 |
| Cameras | Class A | 20.16 | 19.76 | 17.19 | 98.17 |
| Cameras | Class A | 19.90 | 19.51 | 16.97 | 96.92 |
| Cameras | Class A | 19.63 | 19.24 | 16.74 | 95.58 |
| Cameras | Class A | 19.39 | 19.00 | 16.53 | 94.40 |
| Cameras | Class A | 19.22 | 18.83 | 16.39 | 93.59 |
| Cameras | Class A | 18.85 | 18.47 | 16.07 | 91.78 |
| Cameras | Class A | 18.56 | 18.19 | 15.82 | 90.36 |
| Cameras | Class B | 0.00 | 0.00 | 0.00 | 0.00 |
| Cameras | Class B | 17.99 | 17.63 | 15.34 | 87.62 |
| Cameras | Class B | 7.41 | 7.26 | 7.11 | 75.42 |
| Cameras | Class B | 6.21 | 6.08 | 5.96 | 63.20 |
| Cameras | Class B | 4.98 | 4.88 | 4.78 | 50.66 |
| Cameras | Class B | 3.80 | 3.72 | 3.65 | 38.68 |
| Cameras | Class B | 2.57 | 2.51 | 2.46 | 26.12 |
| Cameras | Class B | 1.36 | 1.33 | 1.30 | 13.80 |
| Radios | Class X | 0.00 | 0.00 | 0.00 | 0.00 |
| Radios | Class X | 8.33 | 8.16 | 7.10 | 40.54 |
| Radios | Class X | 8.28 | 8.11 | 7.06 | 40.32 |
| Radios | Class X | 8.19 | 8.03 | 6.98 | 39.89 |
| Radios | Class X | 8.06 | 7.90 | 6.87 | 39.24 |
| Radios | Class X | 7.89 | 7.73 | 6.72 | 38.40 |
| Radios | Class X | 7.67 | 7.52 | 6.54 | 37.37 |
| Radios | Class X | 7.43 | 7.28 | 6.33 | 36.17 |
| Radios | Class X | 7.15 | 7.01 | 6.10 | 34.83 |

Figure 15B

Once the predicted values have been calculated, the optimization process begins. In the top down version, SKUs are assumed to be 100% incremental so the SKUs are ranked in ascending VPC order to determine delete priority.

| POG | Class | Delete Priority | LFF | SKU | Sales | Units | GM | AGM | CM | VPC |
|---|---|---|---|---|---|---|---|---|---|---|
| Cameras | Class A | 1 | 0 | 0 | 0.00 | 0.00 | 0.00 | 0.00 | 0.00 | 0.00 |
| Cameras | Class B | 2 | 0.00 | 0 | 0.00 | 0.00 | 0.00 | 0.00 | 0.00 | 0.00 |
| Radios | Class X | 3 | 0 | 0 | 0.00 | 0.00 | 0.00 | 0.00 | 0.00 | 0.00 |
| Cameras | Class B | 4 | 0.67 | 7 | 12.32 | 1.23 | 1.36 | 1.33 | 1.30 | 13.80 |
| Cameras | Class B | 5 | 0.67 | 6 | 23.32 | 2.33 | 2.57 | 2.51 | 2.46 | 26.12 |
| Radios | Class X | 6 | 0.37 | 8 | 31.09 | 3.44 | 7.15 | 7.01 | 6.10 | 34.83 |
| Radios | Class X | 7 | 0.37 | 7 | 32.30 | 3.58 | 7.43 | 7.28 | 6.33 | 36.17 |
| Radios | Class X | 8 | 0.37 | 6 | 33.37 | 3.70 | 7.67 | 7.52 | 6.54 | 37.37 |
| Radios | Class X | 9 | 0.37 | 5 | 34.29 | 3.80 | 7.89 | 7.73 | 6.72 | 38.40 |
| Cameras | Class B | 10 | 0.67 | 5 | 34.54 | 3.45 | 3.80 | 3.72 | 3.65 | 38.68 |
| Radios | Class X | 11 | 0.37 | 4 | 35.04 | 3.88 | 8.06 | 7.90 | 6.87 | 39.24 |
| Radios | Class X | 12 | 0.37 | 3 | 35.61 | 3.95 | 8.19 | 8.03 | 6.98 | 39.89 |
| Radios | Class X | 13 | 0.37 | 2 | 36.00 | 3.99 | 8.28 | 8.11 | 7.06 | 40.32 |
| Radios | Class X | 14 | 0.37 | 1 | 36.20 | 4.01 | 8.33 | 8.16 | 7.10 | 40.54 |
| Cameras | Class B | 15 | 0.67 | 4 | 45.23 | 4.52 | 4.98 | 4.88 | 4.78 | 50.66 |
| Cameras | Class B | 16 | 0.67 | 3 | 56.43 | 5.64 | 6.21 | 6.08 | 5.96 | 63.20 |
| Cameras | Class B | 17 | 0.67 | 2 | 67.34 | 6.73 | 7.41 | 7.26 | 7.11 | 75.42 |
| Cameras | Class B | 18 | 0.67 | 1 | 78.23 | 1.43 | 17.99 | 17.63 | 15.34 | 87.62 |
| Cameras | Class A | 19 | 0.69 | 7 | 80.68 | 13.45 | 18.56 | 18.19 | 15.82 | 90.36 |
| Cameras | Class A | 20 | 0.69 | 6 | 81.95 | 13.66 | 18.85 | 18.47 | 16.07 | 91.78 |
| Cameras | Class A | 21 | 0.69 | 5 | 83.56 | 13.93 | 19.22 | 18.83 | 16.39 | 93.59 |
| Cameras | Class A | 22 | 0.69 | 4 | 84.29 | 14.05 | 19.39 | 19.00 | 16.53 | 94.40 |
| Cameras | Class A | 23 | 0.69 | 3 | 85.34 | 14.22 | 19.63 | 19.24 | 16.74 | 95.58 |
| Cameras | Class A | 24 | 0.69 | 2 | 86.54 | 14.42 | 19.90 | 19.51 | 16.97 | 96.92 |
| Cameras | Class A | 25 | 0.69 | 1 | 87.65 | 14.61 | 20.16 | 19.76 | 17.19 | 98.17 |

Figure 16

'CAMERAS' SYNTHETIC PLANOGRAMS

2 Ft. Synthetic

| POG | Class | Delete Priority | LFF | Cum LFF | VPC | Sales |
|---|---|---|---|---|---|---|
| Cameras | Class A | 25 | 0.69 | 0.69 | 98.17 | 87.65 |
| Cameras | Class A | 24 | 0.69 | 1.38 | 96.92 | 86.54 |

VPC TOTAL                                          195.09

4 Ft. Synthetic

| POG | Class | Delete Priority | LFF | Cum LFF | VPC | Sales |
|---|---|---|---|---|---|---|
| Cameras | Class A | 25 | 0.69 | 0.69 | 98.17 | 87.65 |
| Cameras | Class A | 24 | 0.69 | 1.38 | 96.92 | 86.54 |
| Cameras | Class A | 23 | 0.69 | 2.07 | 95.58 | 85.34 |
| Cameras | Class A | 22 | 0.69 | 2.76 | 94.40 | 84.29 |
| Cameras | Class A | 21 | 0.69 | 3.45 | 93.59 | 83.56 |

VPC TOTAL                                          478.67

6 Ft. Synthetic

| POG | Class | Delete Priority | LFF | Cum LFF | VPC | Sales |
|---|---|---|---|---|---|---|
| Cameras | Class A | 25 | 0.69 | 0.69 | 98.17 | 87.65 |
| Cameras | Class A | 24 | 0.69 | 1.38 | 96.92 | 86.54 |
| Cameras | Class A | 23 | 0.69 | 2.07 | 95.58 | 85.34 |
| Cameras | Class A | 22 | 0.69 | 2.76 | 94.40 | 84.29 |
| Cameras | Class A | 21 | 0.69 | 3.45 | 93.59 | 83.56 |
| Cameras | Class A | 20 | 0.69 | 4.14 | 91.78 | 81.95 |
| Cameras | Class A | 19 | 0.69 | 4.83 | 90.36 | 80.68 |
| Cameras | Class B | 18 | 0.67 | 5.50 | 87.62 | 78.23 |

VPC TOTAL                                          748.43

Figure 17A

'CAMERAS' SYNTHETIC PLANOGRAMS

8 Ft. Synthetic

| POG | Class | Delete Priority | LFF | Cum LFF | VPC | Sales |
|---|---|---|---|---|---|---|
| Cameras | Class A | 25 | 0.69 | 0.69 | 98.17 | 87.65 |
| Cameras | Class A | 24 | 0.69 | 1.38 | 96.92 | 86.54 |
| Cameras | Class A | 23 | 0.69 | 2.07 | 95.58 | 85.34 |
| Cameras | Class A | 22 | 0.69 | 2.76 | 94.40 | 84.29 |
| Cameras | Class A | 21 | 0.69 | 3.45 | 93.59 | 83.56 |
| Cameras | Class A | 20 | 0.69 | 4.14 | 91.78 | 81.95 |
| Cameras | Class A | 19 | 0.69 | 4.83 | 90.36 | 80.68 |
| Cameras | Class B | 18 | 0.67 | 5.50 | 87.62 | 78.23 |
| Cameras | Class B | 17 | 0.67 | 6.17 | 75.42 | 67.34 |
| Cameras | Class B | 16 | 0.67 | 6.84 | 63.20 | 56.43 |
| Cameras | Class B | 15 | 0.67 | 7.51 | 50.66 | 45.23 |

VPC TOTAL 937.71

10 Ft. Synthetic

| POG | Class | Delete Priority | LFF | Cum LFF | VPC | Sales |
|---|---|---|---|---|---|---|
| Cameras | Class A | 25 | 0.69 | 0.69 | 98.17 | 87.65 |
| Cameras | Class A | 24 | 0.69 | 1.38 | 96.92 | 86.54 |
| Cameras | Class A | 23 | 0.69 | 2.07 | 95.58 | 85.34 |
| Cameras | Class A | 22 | 0.69 | 2.76 | 94.40 | 84.29 |
| Cameras | Class A | 21 | 0.69 | 3.45 | 93.59 | 83.56 |
| Cameras | Class A | 20 | 0.69 | 4.14 | 91.78 | 81.95 |
| Cameras | Class A | 19 | 0.69 | 4.83 | 90.36 | 80.68 |
| Cameras | Class B | 18 | 0.67 | 5.50 | 87.62 | 78.23 |
| Cameras | Class B | 17 | 0.67 | 6.17 | 75.42 | 67.34 |
| Cameras | Class B | 16 | 0.67 | 6.84 | 63.20 | 56.43 |
| Cameras | Class B | 15 | 0.67 | 7.51 | 50.66 | 45.23 |
| Cameras | Class B | 10 | 0.67 | 8.18 | 38.68 | 34.54 |
| Cameras | Class B | 5 | 0.67 | 8.85 | 26.12 | 23.32 |
| Cameras | Class B | 4 | 0.67 | 9.52 | 13.80 | 12.32 |

VPC TOTAL 1016.31

Figure 17B

'RADIOS' SYNTHETIC PLANOGRAMS

2 Ft. Synthetic

| POG | Class | Delete Priority | LFF | Cum LFF | VPC | Sales |
|---|---|---|---|---|---|---|
| Radios | Class X | 14 | 0.37 | 0.37 | 40.54 | 36.20 |
| Radios | Class X | 13 | 0.37 | 0.74 | 40.32 | 36.00 |
| Radios | Class X | 12 | 0.37 | 1.11 | 39.89 | 35.61 |
| Radios | Class X | 11 | 0.37 | 1.48 | 39.24 | 35.04 |
| Radios | Class X | 9 | 0.37 | 1.85 | 38.40 | 34.29 |

VPC TOTAL                                          198.40

4 Ft. Synthetic

| POG | Class | Delete Priority | LFF | Cum LFF | VPC | Sales |
|---|---|---|---|---|---|---|
| Radios | Class X | 14 | 0.37 | 0.37 | 40.54 | 36.20 |
| Radios | Class X | 13 | 0.37 | 0.74 | 40.32 | 36.00 |
| Radios | Class X | 12 | 0.37 | 1.11 | 39.89 | 35.61 |
| Radios | Class X | 11 | 0.37 | 1.48 | 39.24 | 35.04 |
| Radios | Class X | 9 | 0.37 | 1.85 | 38.40 | 34.29 |
| Radios | Class X | 8 | 0.37 | 2.22 | 37.37 | 33.37 |
| Radios | Class X | 7 | 0.37 | 2.59 | 36.17 | 32.30 |
| Radios | Class X | 6 | 0.37 | 2.96 | 34.83 | 31.09 |
| Radios | Class X | 3 | 0 | 3 | 0.00 | 0.00 |

VPC TOTAL                                          306.77

Figure 18

SYSTEM AND METHOD FOR OPTIMIZING DISPLAY SPACE ALLOCATION OF MERCHANDISING USING REGRESSION ANALYSIS TO GENERATE SPACE ELASTICITY CURVES

BACKGROUND OF THE INVENTION

1. Technical Field

This disclosure relates to modeling retail store space. In particular, this disclosure relates to a top-down or aggregated approach for modeling and optimizing the physical layout parameters of a plurality of retail establishments using elasticity modeling.

2. Background

Sales and profitability of retail stores greatly depend upon the appeal and arrangement of the products on display. Most retail establishments display the products on shelving and display units, which may be arranged in aisles. Such display units and shelving may be arranged in various configurations having various dimensions. A planogram or POG is a map of fixtures and products that illustrate how the products are displayed, the number of products displayed, and the location or relative location where the products are displayed. Shelf space is a limited resource in the store environment, and carrying inventory also incurs a cost. Thus, retailers are interested in maximizing the returns from their available shelf space and inventory by making sure they create planograms that best allocate space to the various types of products.

However, it is not always clear just exactly how space related parameters affect store sales and profitability, and to what degree. For example, a retailer may need to change the amount of linear feet of display to add new products and/or eliminate existing products. Accordingly, management would prefer to eliminate products that have the least adverse impact on profitability. Management may also wish to identify products that contribute positively to incremental sales and profitability so as to maximize sales and profitability, and they may also wish to know in advance the likely result of remodeling a store or "re-flowing" the display arrangement or store aisle configuration.

In that regard, some statistical methods have been used to attempt to correlate individual products or "SKUs" with store metrics using regression analysis. However, known regression methods are inadequate when product turn-over is high and/or when new products are rapidly introduced. When a product lifecycle is fast and such products become obsolete quickly, it is difficult to analyze the corresponding data and make valid predictions regarding the likely effects of remodeling or product addition/deletion on store sales and profitability. For example, the turn-over of electronic goods in a retail store is extremely rapid, and typically within a two month period, 50% of the products may change completely. In addition, because of the large amounts of data required, some retailers may not wish to analyze their space allocation at an item or SKU level.

Because of the high turn-over and rapid obsolesce of certain retail products, or due to lack of data, there is a need for an analytical tool that can assist retail establishments in modeling, evaluating, and optimizing the impact of changing the product mix and display layout.

SUMMARY

A system and method for optimizing display space allocation for merchandise in stores includes a computer system having a processor and memory, a database in communication with the computer, which is configured to save data for a plurality of stores, and a data updating module configured to periodically receive raw data corresponding to the plurality of stores, filter the raw data, and update the database with updated data for the plurality of stores.

A curve fitting module applies regression analysis to generate space elasticity curves corresponding to the updated data for a plurality of combinations of a store cluster, a performance metric, a planogram, and a segment. A synthetic data creation module receives user-selected input parameters and generates synthetic item records based on corresponding space elasticity curves. The synthetic item records are configured to model a resulting change in selected performance metrics for one or more stores, in response to proposed changes in the corresponding planogram and segment. An analysis and optimization module compares the synthetic item records across a plurality of segments to provide an indication of an optimum order in which to increase or decrease space in the corresponding planograms and segments based on a user selected goal.

The raw data for the plurality of stores includes point-of-sale data, planogram data, and segment data, and a transform, filter, and load module filters the raw data and saves the updated data in a plurality of standardized data tables. The updated data includes information corresponding to sales data, planogram, and segment. The data updating module may perform updating based on a twelve month rolling average, and may be performed in a batch processing mode.

The plurality of stores are grouped into between two and five store clusters, with each store cluster having between 100 to 500 stores, and the space elasticity curves are based on an S-shaped curve or diminishing returns curve.

The system uses elasticity modeling enables cross category "macro" optimization of space for any group of stores and items using summarized point-of-sale (POS) data. A space elasticity curve is periodically created for each combination of performance metric, store cluster, planogram, and item segment, and is then scaled by individual store, and stored as curve coefficients. Performance metrics may include units sold, sales, gross margin or profit (GM), adjusted gross margin or profit (AGM), and contribution margin (CM).

A user can then select any combination of stores and planograms, and the system then reconstructs the elasticity curves as individual "synthetic items" (synthetic data), which are averaged across the selected stores by creating average synthetic SKU records that reflect the estimated average store performance in each performance metric, for the user-selected set of stores, planograms, and segments. The synthetic items are then used to either evaluate macro space performance across or within store areas, or to determine the best use of overall space available, subject to user-defined business rules limiting the amount or relative change in space for any planogram or segment.

Other embodiments of systems, methods, features, and their corresponding advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and the description. The components in the figures are not necessarily to scale, emphasis instead being placed upon illustrating the principles of the invention.

FIGS. 7-18 illustrate an example showing optimization of a portion of a hypothetical retail store or group of stores.

DETAILED DESCRIPTION OF THE PREFERRED EMBODIMENTS

Figure 1:
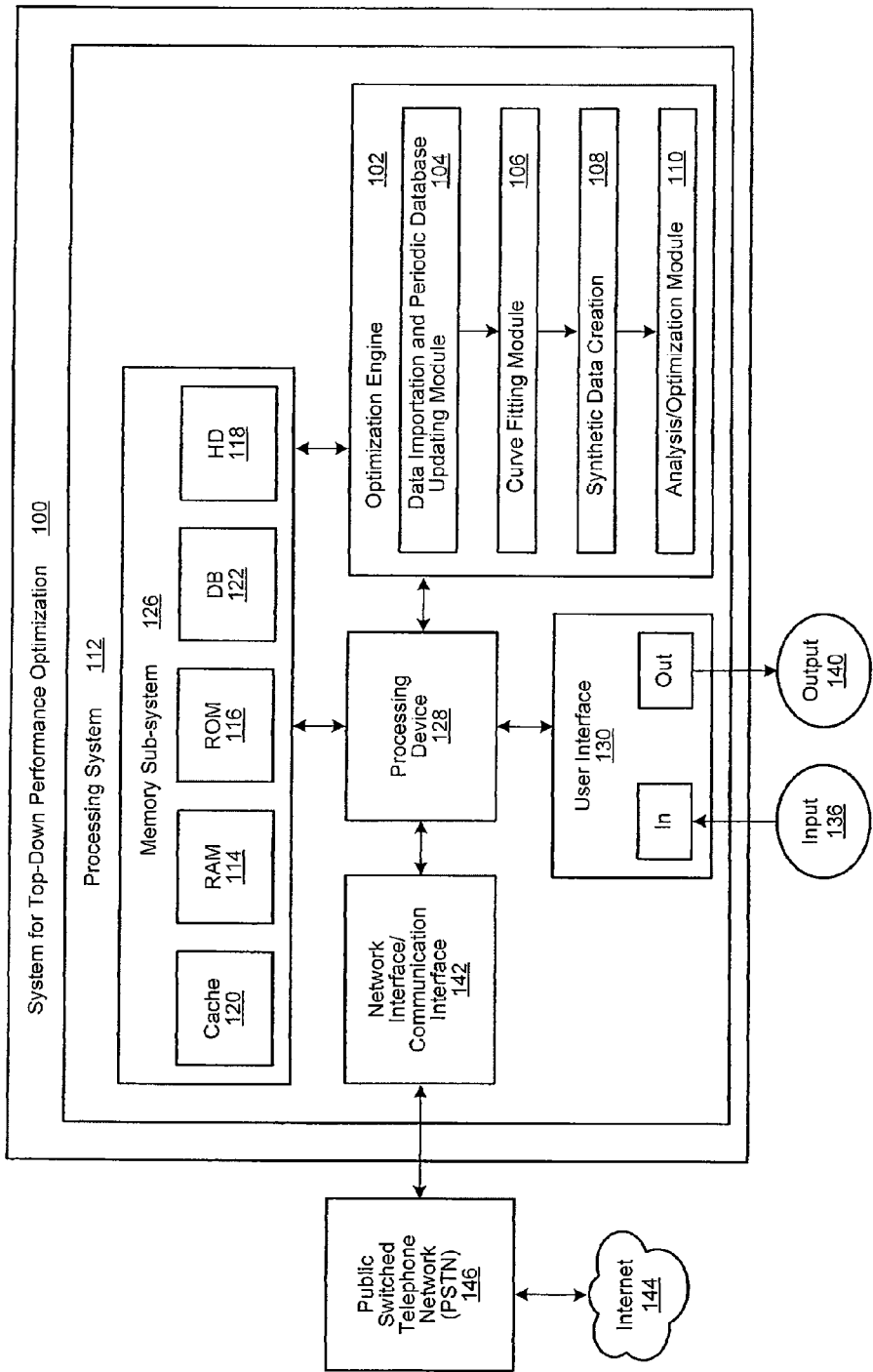
FIG. 1 shows a computing platform and environment.

As shown in FIG. 1, a system 100 for top-down performance optimization using elasticity modeling provides a platform for applying a statistically rigorous process to enable cross category "macro" optimization of space layout for any group of stores and items using summarized point-of-sale (POS) and profitability data. The system 100 for top-down performance optimization using elasticity modeling is used by management and store planning personnel to plan and remodel stores, handle "reflow" of an aisle in a store or group of stores, or perform a rearrangement of a section of an aisle.

The system 100 provides the optimal order in which to add or delete items or space so as to minimize the impact on a particular performance metric. For example, if the user wishes to reduce total space by 10% in a particular section of a particular aisle or in a particular set of stores, the system 100 creates an analysis (or can generate a report) that indicates the ideal number of items and the amount of space that should be deleted from or added to each group of items within each planogram, and in what order so as to maximize store profit, or some other metric of interest.

The specific embodiment of FIG. 1 is a high-level hardware block diagram of a computer system on which the system 100 for top-down performance optimization using elasticity modeling may be implemented. The system 100 for top-down performance optimization using elasticity modeling may be embodied as a system cooperating with computer hardware components and/or as a computer-implemented method.

The system 100 includes an optimization engine or processor 102, which in turn, includes a data importation and periodic database updating module 104, a curve fitting module 106, a synthetic data creation module 108, and an analysis/result optimization module 110. The modules 104, 106, 108, and 110, and all other modules referred to in this document, may be implemented in hardware, software, firmware, or any combination of hardware, software, and firmware, and may or may not reside within a single physical or logical space. For example, the modules 104, 106, 108, and 110, and other modules referred to in this document and which may or may not be shown in the drawings, may be remotely located from each other and may be coupled by a communication network.

The system 100 includes a computer or processing system 112, which includes various hardware components, such as RAM 114, ROM 116, hard disk storage 118, cache memory 120, database storage 122, and the like (also referred to as "memory subsystem" 126). The computer system 112 may include any suitable processing device 128, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 128 may be an Intel Pentium® microprocessor, x86 compatible microprocessor, or equivalent device, and may be incorporated into a server, a personal computer or any suitable computing platform.

The memory subsystem 126 may include any suitable storage components, such as RAM, EPROM (electrically programmable ROM), flash memory, dynamic memory, static memory, FIFO (first-in first-out) memory, LIFO (last-in first-out) memory, circular memory, semiconductor memory, bubble memory, buffer memory, disk memory, optical memory, cache memory, and the like. Any suitable form of memory may be used whether fixed storage on a magnetic medium, storage in a semiconductor device, or remote storage accessible through a communication link. A user or system manager interface 130 may be coupled to the computer system 112 and may include various input devices 136, such as switches selectable by the system manager and/or a keyboard. The user interface also may include suitable output devices 140, such as an LCD display, a CRT, various LED indicators, printer, and/or a speech output device, as is known in the art.

To facilitate communication between the computer system 112 and external sources, a communication interface 142 may be operatively coupled to the computer system. The communication interface 142 may be, for example, a local area network, such as an Ethernet network, intranet, Internet, or other suitable network 144. The communication interface 142 may also be connected to a public switched telephone network (PSTN) 146 or POTS (plain old telephone system), which may facilitate communication via the Internet 144. Dedicated and remote networks may also be employed, and the system may further communicate with external exchanges and sources of information 146. Any suitable commercially-available communication device or network may be used.

Figure 2:
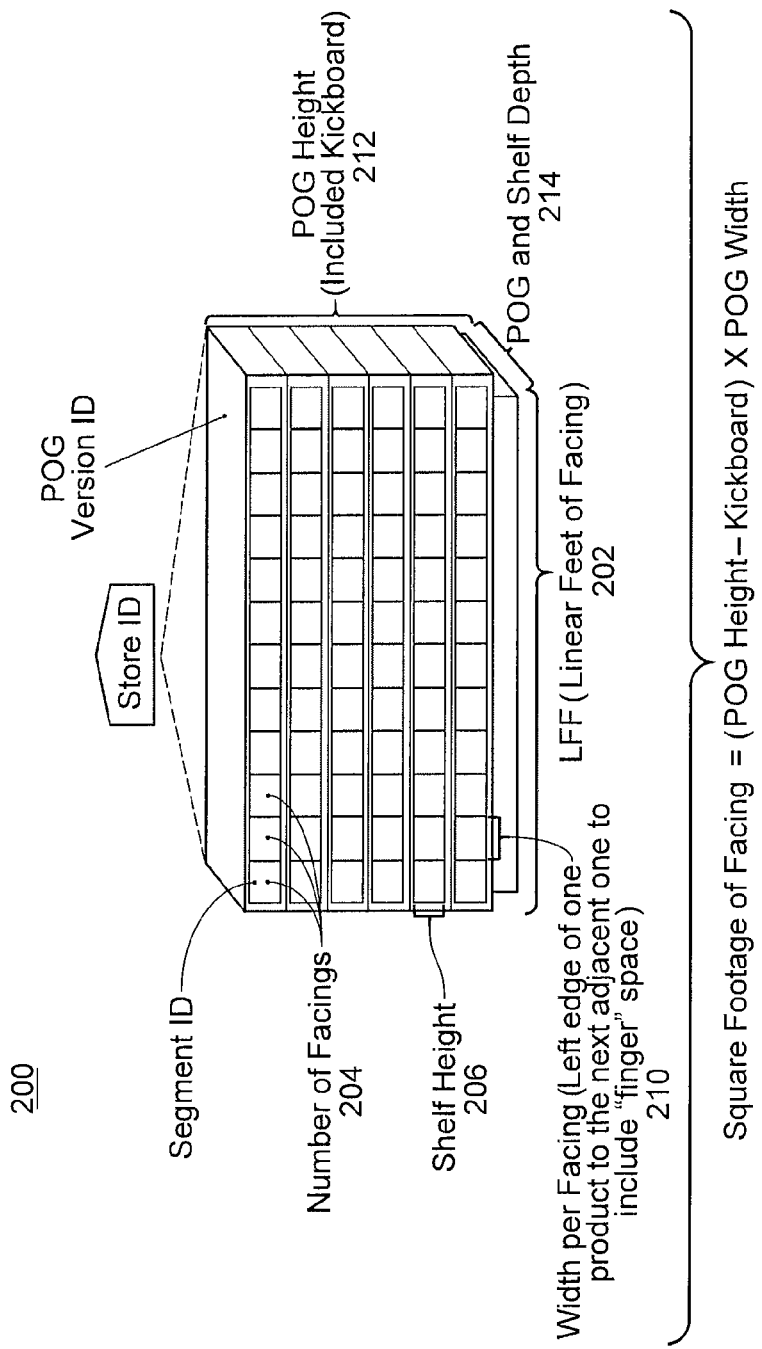
FIG. 2 is a pictorial diagram of a planogram or POG.

FIG. 2 is a pictorial diagram of a planogram 200 or POG (Plan-O-Gram). As mentioned above, a planogram or POG is a logical map of fixtures and products that describes how the products are displayed, the number of products displayed, and where the products are displayed. A particular store may house its products on dozens or perhaps hundreds of different shelves or displays represented by the planograms. Any suitable representation or arrangement applicable to the store or group of stores of interest may be used.

Typically, the planogram 200 indicates the linear facing feet (LFF) 202 and other physical dimensions, number of facings 204 (specific to the item or SKU), the location of the item identified by an item identifier or number, such as an SKU number, shelf height 206, width per facing 210, planogram height 212, and planogram shelf depth 214. The term "segment" will be used throughout this document to indicate a collection or particular grouping of SKU numbers that may have some common attributes. For example, a segment may represent all televisions in a particular store without regard to the type of television. Thus, the "television segment" may include all SKU item numbers for flat-screen TVs, plasma TVs, projection TVs, and the like. Any suitable hierarchy may be used to group SKU-based item or products together. Thus, as referred to herein, the term SKU represents the smallest description of a product, while the term "segment" represents a collection of one or more SKUs.

Figure 3:
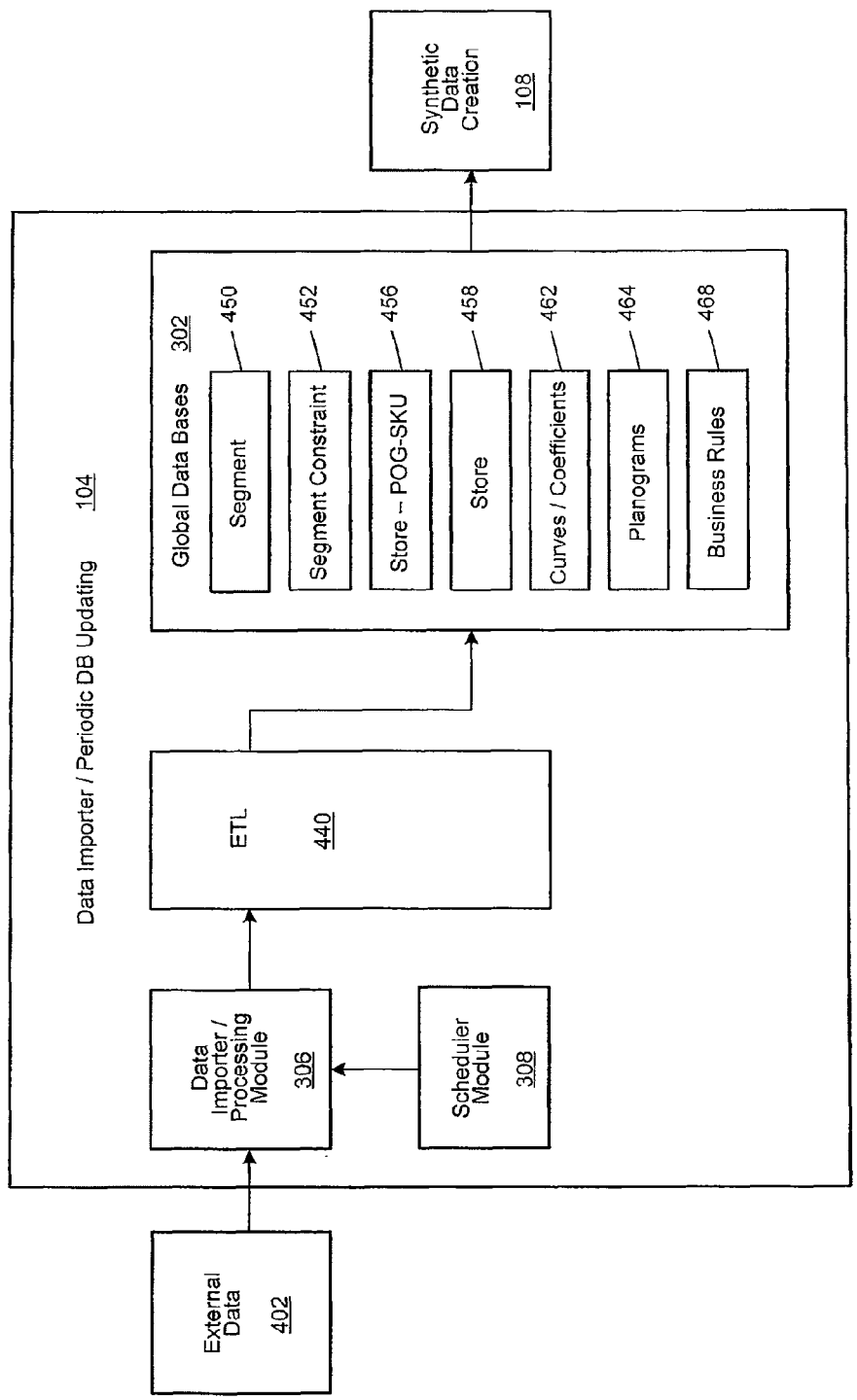
FIG. 3 illustrates the data importation and periodic database updating module.

FIG. 3 shows the data importation and periodic database updating module 104. The data importation and periodic database updating module 104 may include one or more global storage databases 302 operatively coupled to a data importer processing module 306. Periodic operation of the data importer processing module 306 is controlled by a scheduling module 308.

Note that in some embodiments, the system 100 may be applied to support a global network of stores. For example, in addition to grouping stores in a national chain of stores or subset thereof, stores may be further grouped into "banners" or "chains," which may use different currencies to represent performance. The data for these banners may be imported and stored either separately or together in the same data structure for use in space optimization.

The global storage databases 302 may be separate from or included with the database 122, and house all of the data pertinent to all of the stores. Further, although the global storage databases 302 are shown within the data importation and periodic database updating module 104 in FIG. 3 for purposes of illustration only, such databases 302 may be located separately or remotely from the data importation and periodic database updating module 104. Large chain stores may have thousands of stores, and data for all such stores is contained in the global storage databases 302, which may be a set of distributed or remotely coupled databases.

Figure 4:
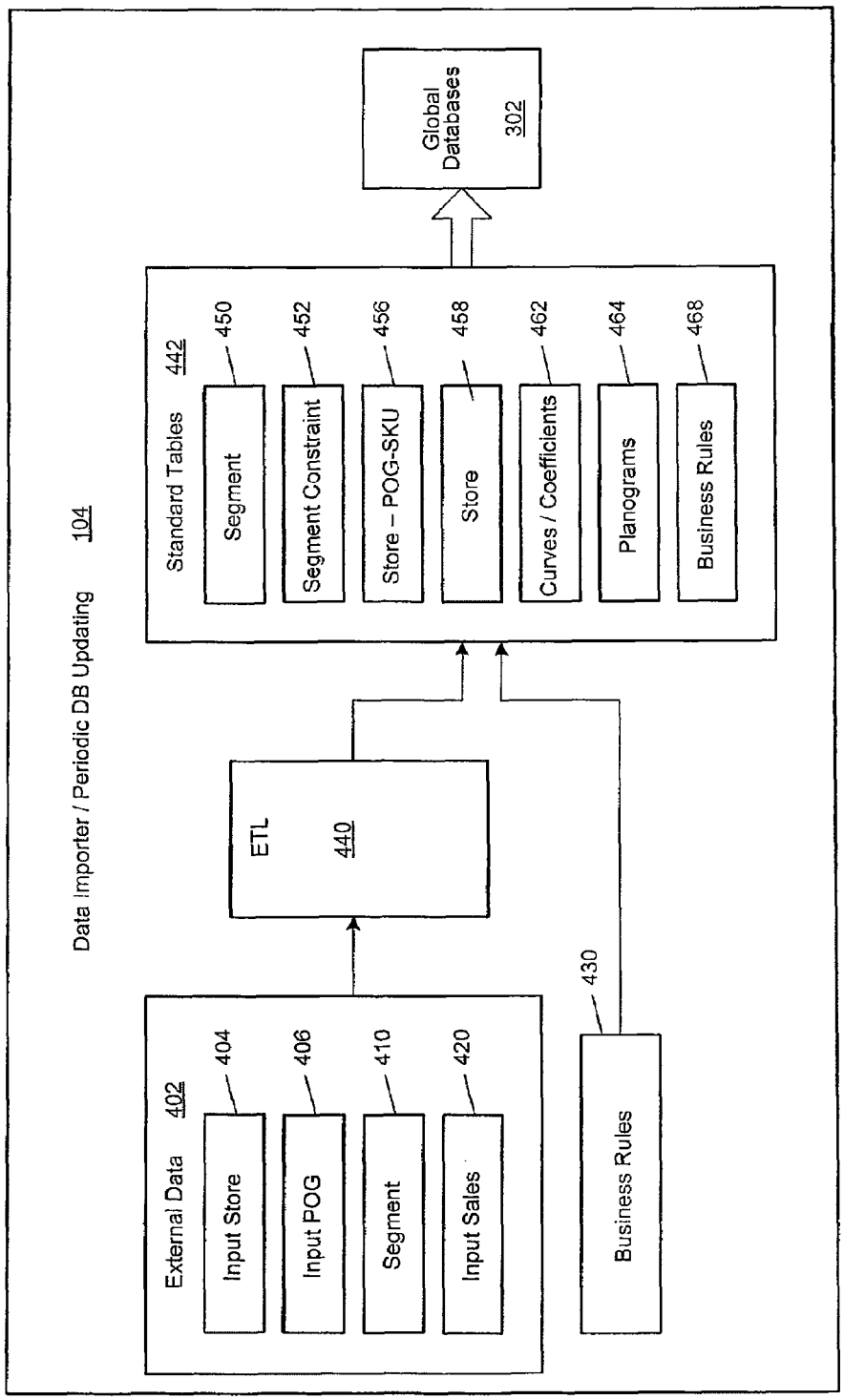
FIG. 4 illustrates a data flow diagram.

FIG. 4 shows a dataflow diagram corresponding to the components of FIG. 3. The data flow diagram shows the importation of external data 402, which is imported and processed, and eventually stored in the global storage databases 302. The external data 402 may include all of the pertinent raw data, which may be obtained from the multiple POS terminals and other data gathering devices of the stores. Raw external data 402 may include actual sales or store data 404, planogram data 406, such as the arrangement of planograms, physical layout and dimensions, and location within the store, segment master files 410, sales data 420, such as sales volume, sales profit data and the like, and business rules 430.

The raw data is processed by an extract, filter and load module (EFL) 440, also referred to interchangeably as an extract, transform and load module (ELT) 440, which loads the data, merges and joins various portions of the data, rejects bad or non-conforming records, and issues error reports based on such rejected data. the extract, filter and load module (ETL) 440 may be implemented using a Sequel Server. The extract, filter and load module (ETL) 440 can also flag or eliminate out of range values, exclude non-conforming data, and filter various data based on predetermined criteria. The extract, filter and load module 440 then loads the raw data into standardized tables 442 having a standardized format used by subsequent processing modules of the system 100. Any suitable data structure may be used to contain the data, such as tree structures, graphs, linked lists, multi-dimensional table or lists, and the like.

Some of the standardized tables 442 created include segment tables 450, segment constraint tables 452, and store-planogram SKU tables 456, which represents segment performance data for every store and for every planogram in every store. The standardized tables 442 may also include a store identifier table 458, which may further contain predefined groups of stores (for example, all New York stores), curve coefficients tables 462, planogram tables 464, and business rule tables 468. The business rule tables 468 may be default rules that reflect the imported data for business rules 430.

In one embodiment, the extract, filter, and load module 440 updates/creates the standardized tables 442 on a monthly basis using a twelve month rolling average. This process may be performed in a batch mode or in a background mode. The process may be performed at intervals greater than or less than one month, depending upon the requirements of the project. The frequency of data updating is controlled by the scheduler module 308, which determines when such updates are to occur. Preferably, updates are scheduled when processing loads are light.

Note that the segments (segment table 450) preferably represent groupings of items or SKUs rather than a single SKU, although in some specific cases, a segment may contain only a single SKU number. However, because the system 100 is best suited for retail store operation having a large number of stores, and with each store having possibly thousands of individual items or SKUs, most segments represent multiple SKUs.

Figure 5:
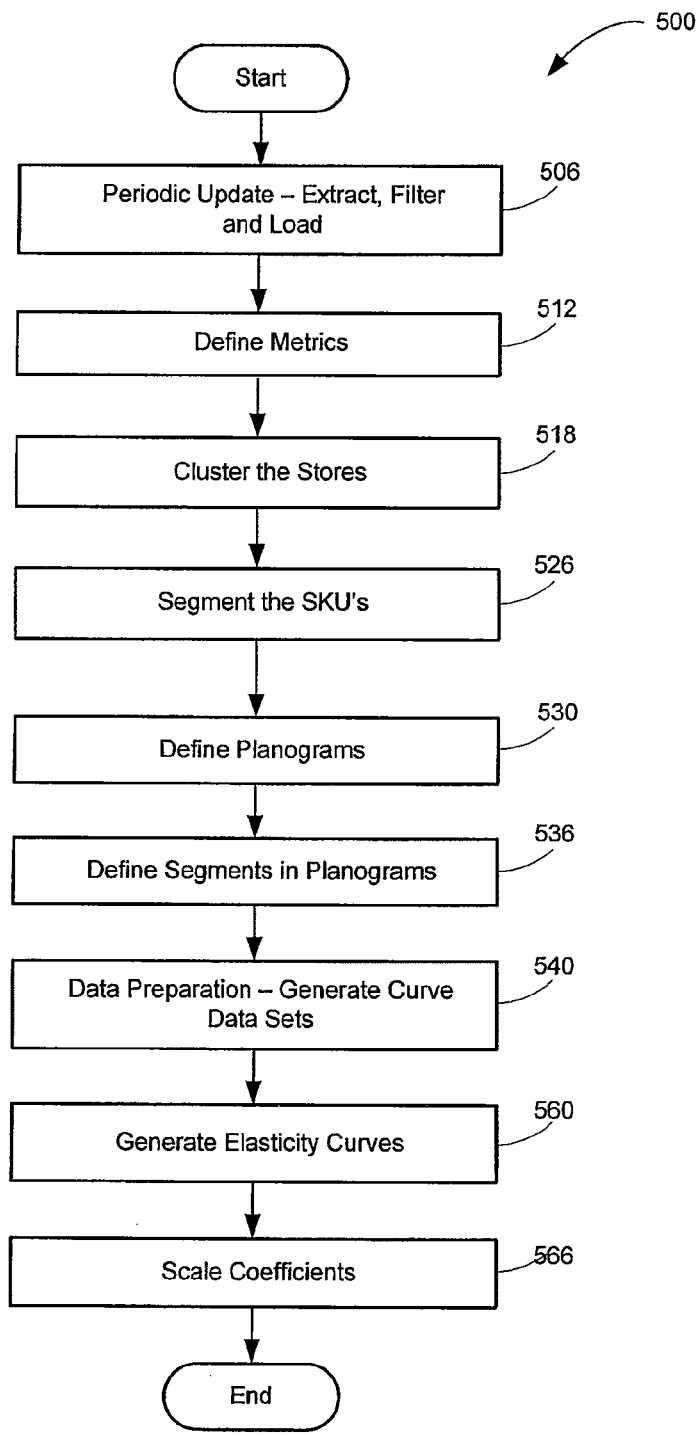
FIG. 5 is a flowchart showing an updating process and elasticity curve creation process.

FIG. 5 is a high-level flowchart showing the steps 500 that the data importation and periodic database updating module 104, and the curve fitting module 106 may take. As described above, periodic updating of the global databases 302 is performed using the extract transform and load module (step 506), which updates the standardized tables 442 stored in the global databases 302.

Next, the various performance or volume metrics are defined (step 512). In one embodiment, five main volume or performance metrics are used, including units or number of consumer units sold, sales (sales dollars or other currency), gross margin (GM), adjusted gross margin (AGM), and contribution margin (CM), also in any currency. Adjusted gross margin may be the "net" of some other parameter, and may include for example, rebates from the vendor to the retailer to pay shelf allowance, discounts, rebates, freight allowances, and other amounts that modify the retailer's margin. The contribution margin is the adjusted gross margin less distribution or other costs. Other performance metrics may be used depending upon the application and the specific nature of the business.

The stores are then clustered (step 518) or grouped using a variety of criteria depending on the application and data available. Clustering of the stores will group similar stores within one cluster. In one embodiment, the stores are grouped or clustered according to selected store characteristics for each combination of planogram and segment, such as stores with high sales volume, stores with medium sales volume, and stores with low sales volume. Other clustering criteria include sales productivity per unit of space for each planogram/segment combination may also be used as a clustering criteria (i.e., low sales/linear foot of facing (LFF), medium sales/LFF, and high sales/LFF). Other criteria may be used to cluster the stores, depending upon the application and the nature of the business, to improve the ability of the system to estimate the impact of changes in space on each performance metric.

For example, stores may be clustered according to a two-step process, with a first clustering process occurring external to the system 100, with the results thereof handled as part of the external data 402. In this example, the first step of clustering may be based on a combination of statistical criteria that evaluates sales in total or by category versus various store characteristics, such as type or size of store, market demographics, or other grouping criteria. The second clustering process may then be based on any other clustering criteria, including those previously described.

Any number of clusters and suitable clustering criteria may be used. In one embodiment, three clusters are used. However, any suitable number of clusters may be used, for example, between about 2 clusters to about 5 clusters. In another embodiment, each cluster may preferably contain a minimum of one-hundred stores. However, other suitable numbers of stores per cluster may be used. For example, each cluster may contain between about 100 stores to about 500 stores.

As mentioned above, the system 100 preferably does not operate on the SKU level, but rather, operates generally on the segment level, although SKU data is available at the database level. Thus, a plurality of products (SKUs) are aggregated into segments to provide an "averaged view" of a particular group or class of products, referred to as a segment. This top-down or aggregated view of the products increases efficiency of the system and permits accurate modeling and forecasting, particularly in retail markets where product turnover is high, and where new products are rapidly and continuously injected into store displays. Because stores cannot accommodate an unlimited number of products, when new products are added, old products are generally eliminated, subject to changes in available planograms and display space constraints. The system 100 permits management personnel to evaluate and plan for such additions and deletions of displayed merchandise without having to know about the individual items, which may not even be introduced yet.

Next, for each store, the planograms are identified and defined (step 530), and the segments for each planogram are further defined (step 536). Some stores may use the same planograms or a subset of planograms, depending on its size and layout. It is unlikely that in a retail chain having hundreds or thousands of stores, every planogram will be unique. Thus, some planograms may be common to multiple stores. Again, as mentioned above, each segment preferably represents multiple products or SKU's so as to reduce the number of combinations. Each planogram could contain any number of segments. For example, a typical planogram may contain about 5 to 50 segments depending upon the physical dimensions of the planogram and the SKUs that comprise the segment.

Next, data preparation for a curve fitting process is performed based on every combination of performance metric, store cluster, planogram, and segment (step 540) to generate a plurality of curve data sets. In one embodiment, this process may involve scatter plot generation or other data representations. This process is not necessarily performed as part of the periodic database updating, but rather, an output may be provided to the user to help the user understand the quality of the curve fitting and the behavior of the curves. Accordingly, data preparation may be performed on a user-demand basis, a periodic basis, or some other basis.

The number of curve data sets may be quite large. For example, a large retail store chain may have 1,200 stores (divided into, for example, 3 clusters of 400 stores each), each with 120 planograms per store, with each planogram composed of 10 segments. Assuming the 1,200 stores are grouped into three clusters, 18,000 separate curve data sets are produced (5 performance metrics*3 clusters*120 planograms*10 segments=18,000).

Once the data has been prepared for the curve fitting process for all combinations of performance metric, store cluster, planogram, and segment (step 540), a space elasticity curve is produced for each of the combinations (step 560). The curve fitting module or engine 106 generates the space elasticity curve corresponding to each curve data set and attempts to fit the best curve to the curve data set. Note that a curve data set and corresponding space elasticity curve exist for every combination of performance metric, store cluster, planogram, and segment. This is based on the store cluster, not the individual store.

The space elasticity curve is used to model a change in store space and the resulting change in performance (metric) due to that change in store space for a particular segment. The metric of interest is the dependent variable (Y-axis), while the change in store space (linear feet of facing) is the independent variable (X-axis). The curve fitting engine 106 may be a commercially available statistical module that applies regression analysis or other statistical calculations to the input data. The term "space" in the phrase "space elasticity curve" indicates that the data is regressed against a particular metric of spacing (space layout for products) in the store. Total linear feet of facing (LFF) is one metric used when generating the space elasticity curve, but other space metrics can be used, such as square feet or cubic feet of shelf space in the store.

The curve fitting engine 106 may be any suitable curve fitting engine or software package, such as is commercially available from TIBCO Software Inc. of Palo Alto, Calif. as S+ version 8 running under Microsoft Windows. The function "optim" in the TIBCO engine may be used during curve fitting. A further suitable curve fitting engine or software package is commercially available from SAS Inc. of Cary, N.C., as SAS version 9.3 running under Microsoft Windows. Any suitable curve fitting hardware or software package or module may be used that is capable of curve fitting using an S-shaped curve or diminishing returns curve.

The curve fitting engine 106 preferably uses an S-shaped curve or diminishing returns curve, or similarly shaped curve when performing curve fitting because such curves approximate the corresponding data in the curve data sets. Such curves having an S-shaped curve or diminishing returns type curve are generally applicable because sales and other performance metrics often reflect the law of diminishing returns where a further increase in the independent variable past a certain point has little impact on the dependent variable. One can see that increasing the number of items in a store past a certain point will not necessarily increase the store's sales. It is generally true that sales follow a Pareto type distribution, for example where 80% of sales are generated by the top 20% of the products, and the remaining 20% of the sales are generated from the remaining 80% of the products.

The curve fitting engine or software module 106 may use different regression processes to process the data. Preferably, a least-squares process is applied, but any suitable process may be used, such as regression trees, Chi-squared regression, least squares regression, regression sum of sequences, error sum of sequences, orthogonal regression, and other regression processes and techniques may be used.

After the space elastic curves are generated, each such curve, or rather the corresponding coefficients, are regenerated and scaled (step 566) for the store in the store cluster to provide a scaled space elasticity curve corresponding to each store. This permits the behavior of each curve to be observed relative to any particular store in the store cluster. The use of scaling at the store level permits the user, later in the process, to select any combination of stores to model and optimize with respect to space. In one embodiment, the curves are scaled and new coefficients generated (scaled space elasticity curve coefficients) for each of the five performance metrics mentioned above (units sold, sales, gross profit, adjusted gross profit, and contribution margin). However, the scaling may be performed for any other suitable metric as well to permit generation of an elasticity curve for each individual store or demand point.

For example, if the sales volume metric is used to scale the coefficients, it is possible to use the space elasticity curve (that was produced for all 400 stores collectively in the given store cluster) to represent any of the individual 400 stores in that store cluster. Thus, using the curve described by the re-scaled cluster coefficients, the sales volume behavior of the cluster of stores against the range of space over which elasticity is being modeled, may be extrapolated to each store within the cluster. For example, in a segment with space elastic sales behavior, a higher volume store would show a greater increase in absolute sales for a 1 foot increase in space than the sales of a lower volume store.

In the above example according to a specific embodiment, 18,000 separate space elasticity curves were generated, which are represented by 36,000 coefficients. Once scaled for each of the 1,200 stores, up to 43,200,000 coefficients (36,000*1,200) may describe the coefficient data set, assuming two coefficients are needed to describe the curve being used. These coefficients may be stored in the global database 302, or the scaling process may be recalculated when a particular store is selected for analysis.

Figure 6:
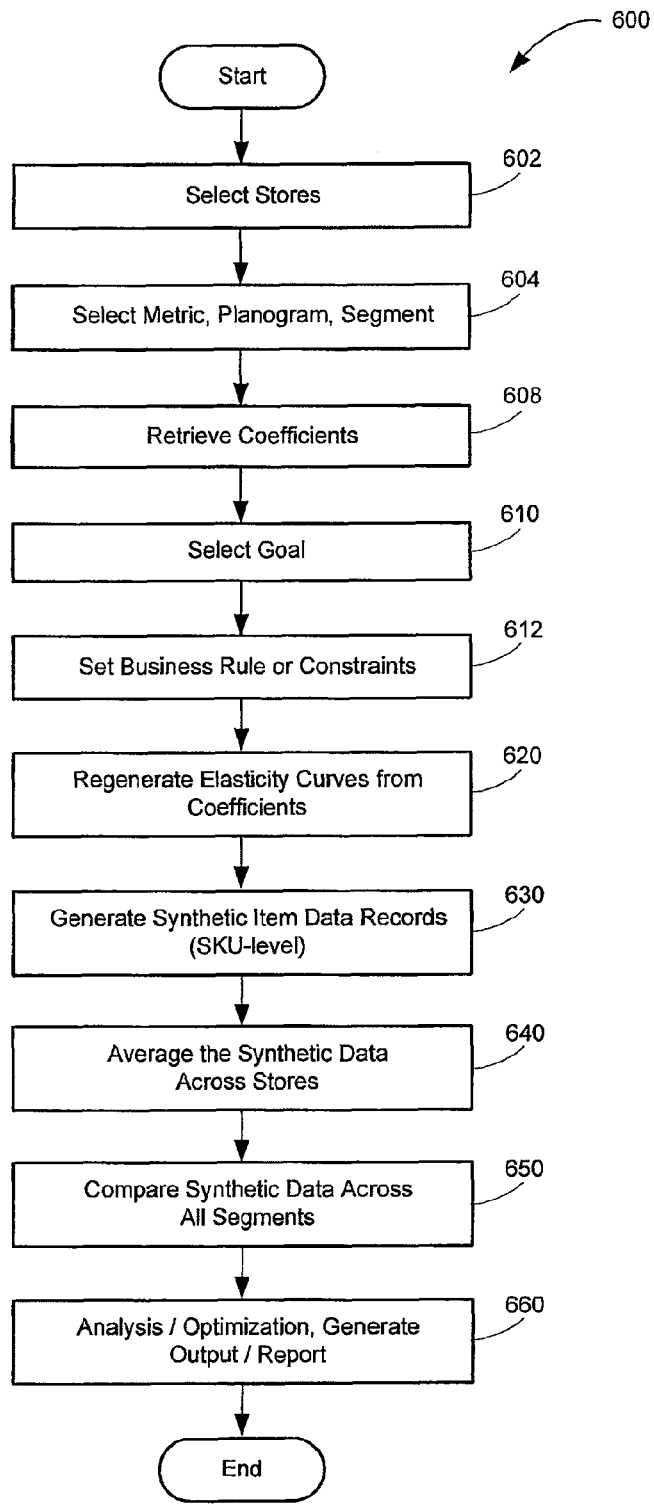
FIG. 6 is a flowchart showing a synthetic data creation process.

FIG. 6 is a high-level flowchart showing the steps 600 that the synthetic data creation module 108 may perform. The synthetic data creation process is a user-demand analysis module that accepts user input parameters, utilizes the data and space elastic curve information, and produces an analysis of estimated changes in the store model under an optimum reallocation of space, subject to the user's rules and restrictions on allowable changes in space. In one embodiment, a report or other suitable output is generated for the user.

For example, a user, such as store management personnel, may wish to remodel or rearrange an entire store, a group of stores, or perhaps may wish only to rearrange a few aisles in selected stores. As another example, a large retail store chain may wish to modernize the look of its stores by widening all of the aisles. To widen the aisles by the desired amount, it may be necessary, for example, to reduce the product display or linear feet of shelving by 20%.

Should management eliminate an entire area of products to meet its reduction number? It would seem unwise to arbitrarily make such a reduction without seeing the effect on the store's profitability. Perhaps making such a sweeping change would eliminate the store's most profitable item. Accordingly, the system 100 for top-down performance optimization using elasticity modeling provides management with a tool for evaluating and predicting changes to product mix, and also provides an incremental analysis showing what changes should be made to either minimize or maximize any selected performance metric or combination of metrics.

The space elasticity curves permit the system 100 to accurately and efficiently model a change in store space and the resulting change in performance (metric) due to that change in store space for a particular segment. Note that the end goal may not necessarily be to maximize the profit metric for a particular planogram or segment. One alternative goal, for example, may be to maximize traffic flow (traffic generator) through a particular aisle rather than sales of products in that aisle, because such traffic flow may increase sales in other aisles. Thus, one may be willing to give up some of sales in a particular planogram/segment to generate traffic increases elsewhere in the store.

As an initial step, the user, such as management personnel, selects the store or group of stores to model or analyze (step 602) and selects the metric of interest. As set forth above, metrics of interest may include units sold, sales, gross margin, adjusted gross margin, contribution margin, or for example, a combination of objective metrics tailored to the strategic objectives of each section of the store. Each component metric of interest corresponds to the dependent variable (Y-axis) in the space elasticity curve. The user also selects the combination of planograms and segments to be optimized, modeled, or analyzed (step 604). The user can select the store or group of stores, the planograms and the segments. Recall that for all combinations of the selected user parameters, a space elasticity curve has been previously generated and/or scaled. Note that the standardized tables previously created 442, such as the store-planogram SKU tables 456, completely identify the physical layout with respect to the planogram for each and every store.

Next, for each store selected by the user for analysis, and for each and every combination of the selected metric, planogram and segment, the coefficients of the corresponding space elasticity curve are retrieved (step 608). The user may also select a particular goal (step 610), such as for example, to model the elimination of a certain amount of total space. The user may also set specific business rules, constraints and/or limitations to the changes to be modeled (612). For example, the total percentage change in shelf space may be limited to a 20% reduction or that any single planogram cannot be reduced by more than 25% in linear footage. Essentially, the business rules provide analytical limits to the changes permitted in the model.

Note that the global databases 302 are updated on a frequent basis to show changes in actual space available in each store. This is separate and independent from the periodic or monthly batch update performed (step 506) to generate new or updated space elasticity curves. The updates to the actual space available in each store may be performed on a daily basis, for example, and have no effect on the space elasticity curves. Rather, such frequent updates permit the user to accurately model using the most current store space information.

Once the user has selected the parameters for the modeling process, the corresponding space elasticity curves are regenerated (step 620) from the coefficients for each combination of selected metric, store, planogram, and segment. Using the regenerated space elasticity curves, "synthetic item records" or "synthetic item data" is then generated (step 630). A synthetic item record or data is a data record created from elasticity curves, which describes the performance and space utilization of one or more items in a specific store, store cluster, planogram, and product segment.

For example if the items in a particular segment occupy an average of 0.1 linear feet each, and at that point on the space elasticity curve, the next 0.1 linear feet of space are expected to generate an additional $1/store/week of sales, the synthetic item record would reflect that increase. The synthetic item records thus simulate the incremental impact of adding each additional item or SKU or group of items that make up an increment of space, rather than reflecting the cumulative performance of the segment (collection of multiple SKU's).

Next, the store spacing (LFF) corresponding to each synthetic SKU is added for all of the selected stores and the sum is divided by the number of stores (step 640) to arrive at an average value across the group of stores selected by the user for modeling, regardless of the store cluster or elasticity curve group to which they belong. The performance data can later be rolled up to an aggregate for the store group. However, using a per store average view of the data for analysis is most useful for analysts using the system.

With respect to the number of stores selected by the user in step 640, such stores represent the actual group of stores selected by the user for analysis. For example, the user may have selected only New York stores to analyze. The above assumes that every SKU in the segment has the same characteristics; that is, all SKUs (actual product dimension) have the same width (linear feet) of facing area. The synthetic item data is based on the actual product or SKU and is not really the actual SKU, but rather, represents an average of the corresponding SKUs.

Next, the synthetic item records are compared across all of the segments and areas selected by the user to determine the optimum order of addition of space across the entire set of segments and planograms selected by the user for modeling (step 650). Because we know how many items or SKUs fit in one linear foot of shelf space in each segment in each planogram, we know that, for example, "synthetic item #1" in segment A on planogram G requires "x" amount of space, and has an impact "y" on a particular performance metric.

A sorting process using the performance of the next available synthetic item across all planograms and segments being analyzed will indicate the optimum way to expand or decrease space across all the product groups. In one embodiment, the synthetic items are combined into "synthetic planograms" (groupings of synthetic items with different lengths) using user defined "space increments" (such as 1 linear foot of facing).

After the optimization results for synthetic item records (and their grouping into optimized space increments) have been created (step 650), the user may select various analysis or optimization scenarios to run (step 660). This may be performed by the analysis/result optimization module 110. This permits an evaluation of how much space and how many items should be added to or removed from each segment within each planogram, based on any total amount of space desired by the user, again, subject to the user's business rules governing the amount of change allowed for any subset of the space.

For example, the user may wish to see the incremental effect of modifying (reducing) store spacing by 8 feet on the selected metric, such as sales or profit. If the goal is to maximize the selected metric, the user can see based on the output of analysis/result optimization module 110, that the selected metric is maximized or at least minimally affected by first removing a portion of segment "x" from planogram A, and perhaps adding some more space for segment "y," based on the incremental effect on the selected metric.

The resulting planogram or "synthetic" planogram (proposed planogram) generated by the analysis/result optimization module 110 (step 660) may include a certain target number of SKUs in segment 1, a target number of SKUs in segment 2, and the like, and each of the SKUs will be responsible for a different amount of sales or other selected metric, which is listed or shown in decreasing numerical order based on its impact on the selected performance metric. The output of the analysis/result optimization module 110 provides an analysis that permits the user to determine on an incremental basis, how much space and which SKUs to eliminate or add to each planogram and segment in order to achieve the desired goal with respect to the selected performance metric.

Thus, the output generated (either in a printed report or visually on a display screen), permits the user to generate an optimum solution under various conditions. The analysis/result optimization module 110 may be commercially available under license from Accenture, as Performance Optimizer Client Server, Version 2009.1.5.28 written in Visual Basic version 8 and VB.net, using SQL Server Database.

FIGS. 7-18 illustrate a detailed example of the above process using retail store data, and may refer back to various processing steps illustrated in FIGS. 5 and 6. In FIGS. 7-18, the term "class" may be used interchangeably with the term "segment" and has the same meaning.

Figure 7:
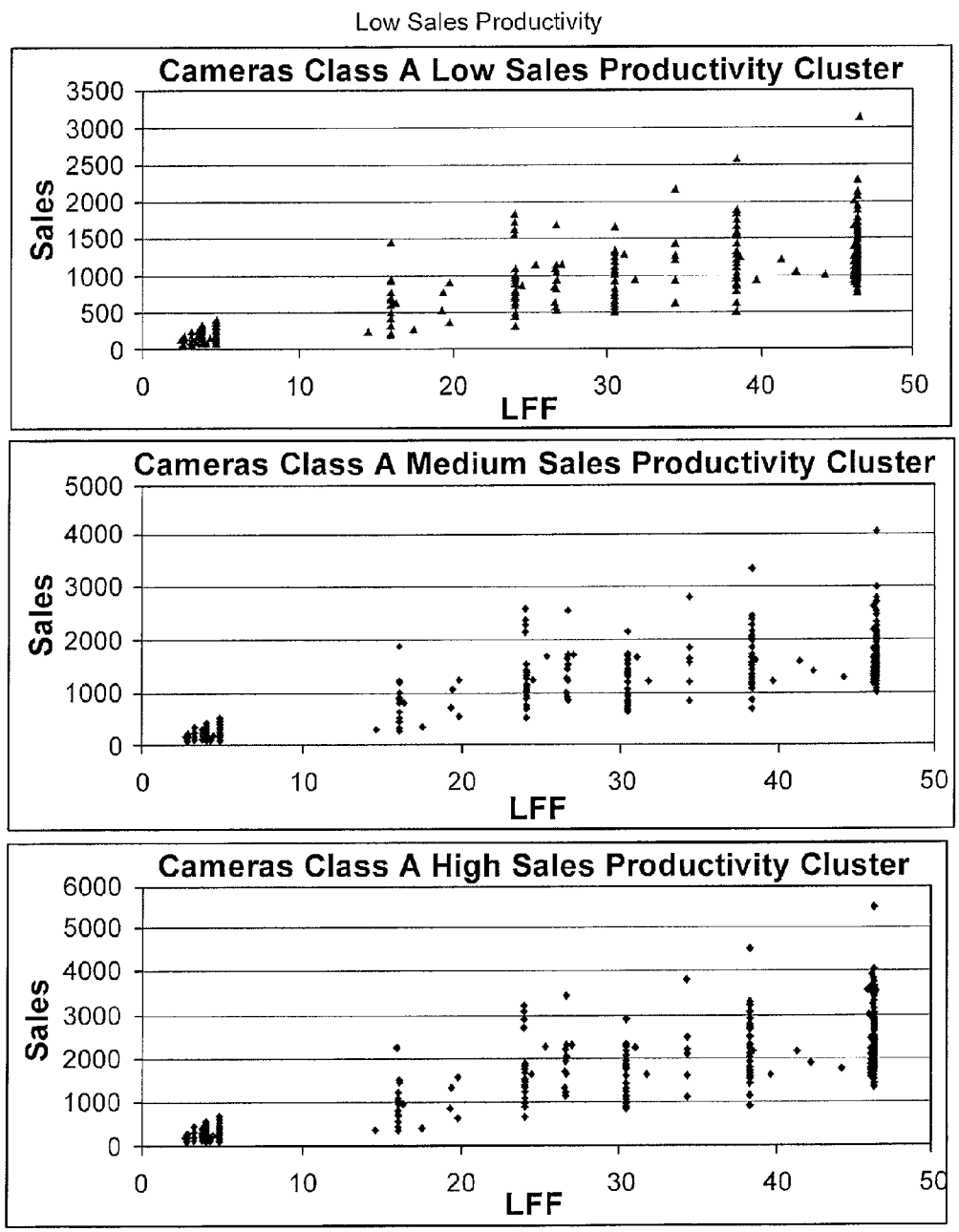
Figure 8:
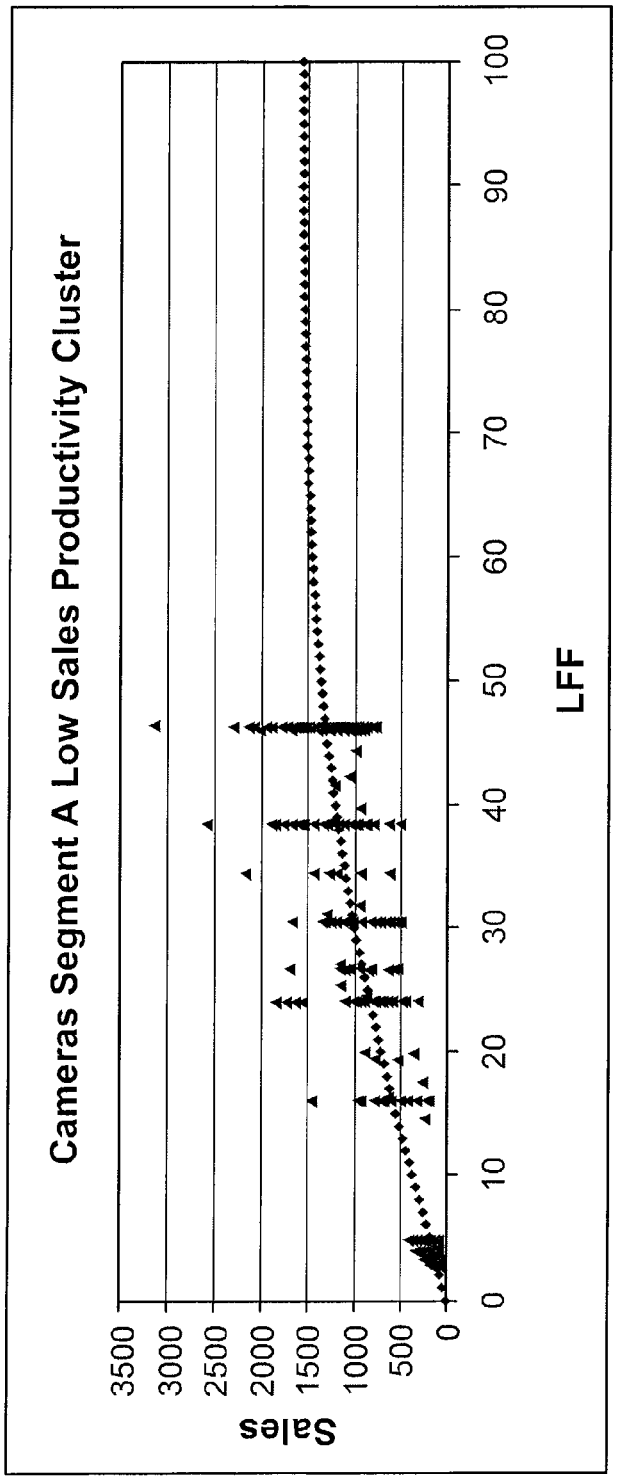

FIG. 7 shows clustering stores into 3 store clusters (see step 518). FIG. 8 shows a space elasticity curve generated corresponding to the store cluster (store cluster for low sales productivity). A space elasticity curve is generated for every possible combination of store cluster, planogram, segment, and performance metric (see step 560), and the coefficients are saved in the global database 302.

Figure 9:
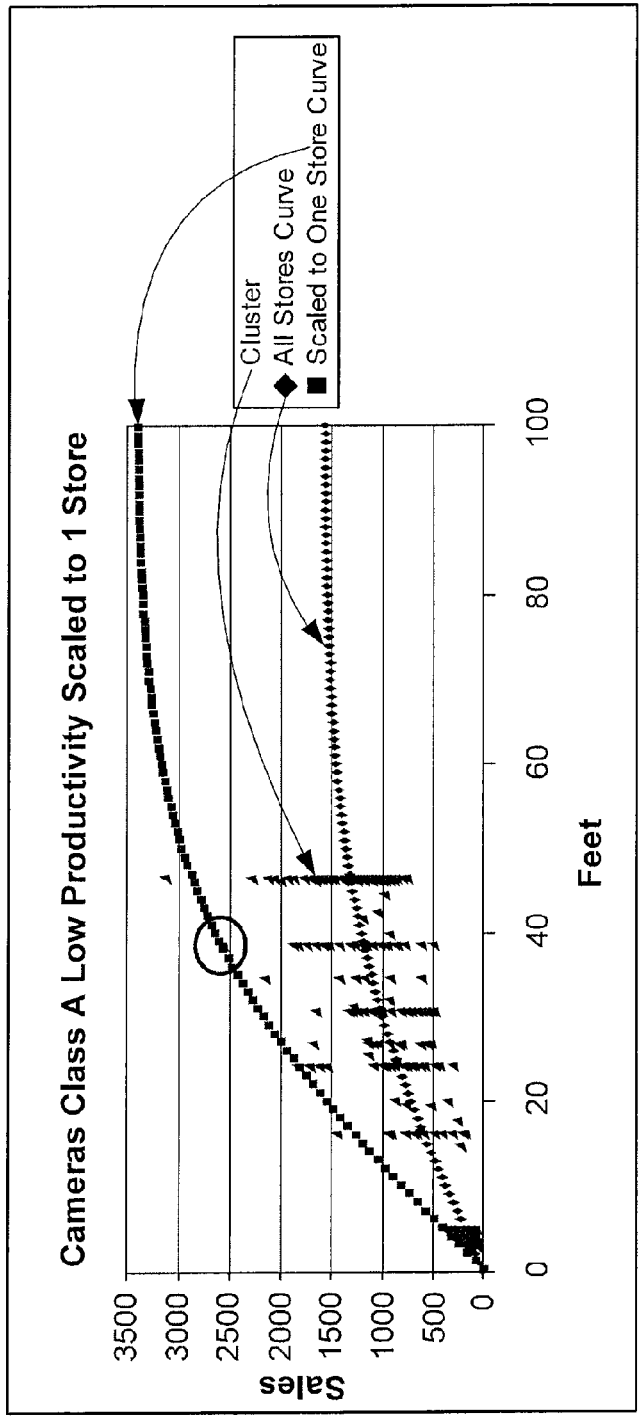

FIG. 9 shows that the space elasticity curves are scaled by each store so that the curve intersects the point representing the selected store. The coefficients are mathematical representations of the elasticity curves. The curves are scaled to each store within each combination of store cluster, planogram, and segment so that any metric can be estimated for any store using the store specific coefficients to recreate the curve.

FIG. 10 shows the creation of synthetic items and determination of the linear feet of facing for each class (segment), and further shows the number of SKUs that would be required (see step 630). Once complete, the average linear feet of spacing and the number of SKUs are calculated for each combination of planogram and segment. Predicted sales, gross margin, adjusted gross margin, and contribution margin may be calculated by substituting the segment values and coefficients previously generated.

Figure 11:
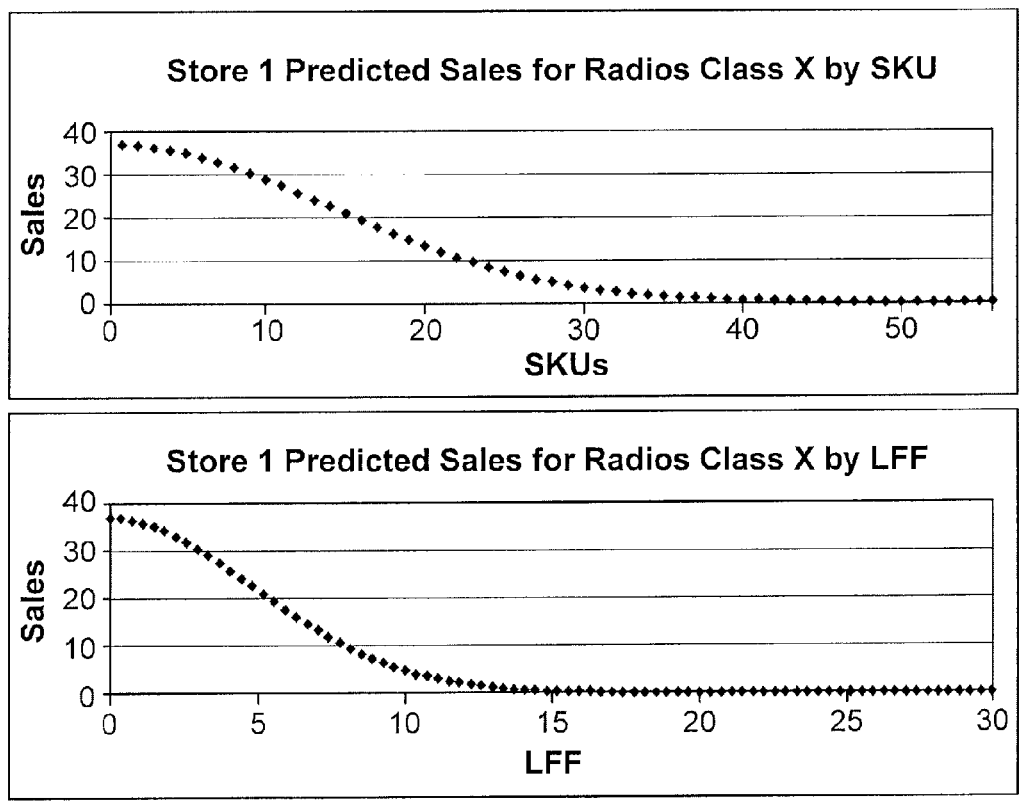

FIG. 11 shows that predicted sales are determined for all SKUs and the linear feet of facing for each store. FIG. 12 shows the calculation applied to all of the user-selected stores under analysis.

Figure 13:
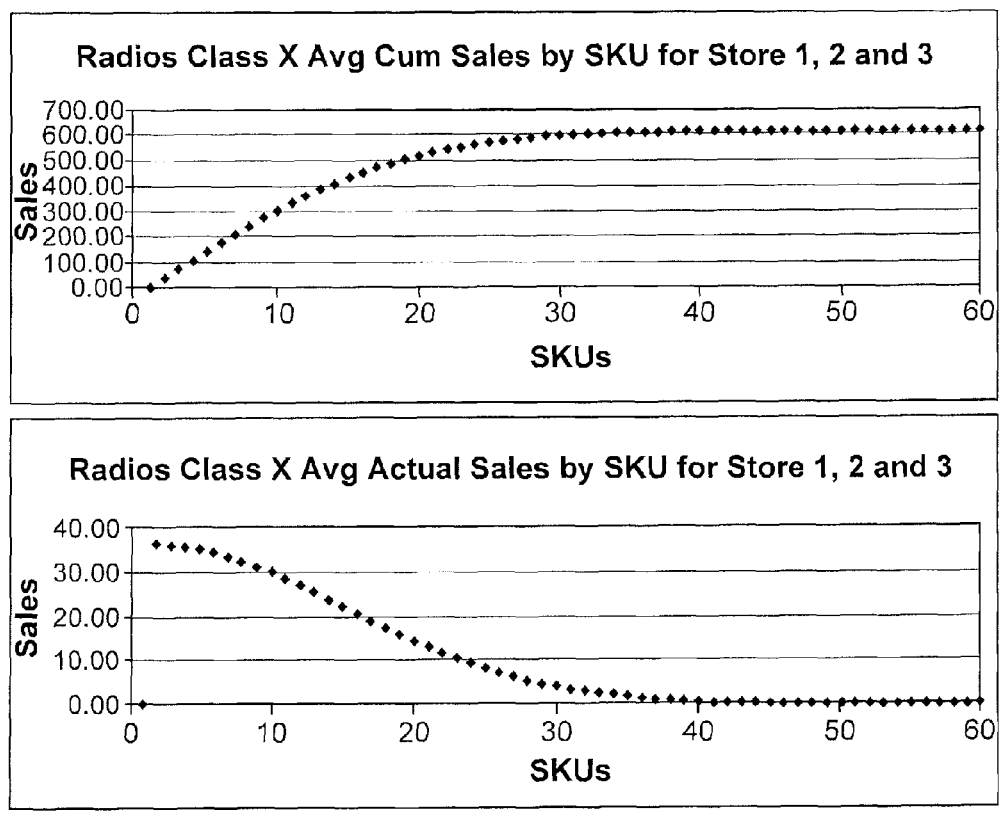

FIG. 13 shows use of the analysis and optimization module 110 to predict sales based on user provided input. The results show the flattening of sales as the number of SKUs for the class or segment of radios nears 30. Similarly, FIG. 14 shows the calculation of FIG. 13 carried out for all performance metrics across three selected stores, while FIGS. 15A and 15B show the calculations repeated for each combination of store, planogram and segment (class) under analysis.

FIG. 16 shows optimization of the store and ranking of the SKUs using a selected performance metric. Based on the ranking, the user can determine how various SKUs and space should be deleted or added. FIGS. 17A, 17B, and FIG. 18 show that after items are ranked and deletion priorities assigned, the SKUs can be combined into "synthetic planograms." A synthetic planogram is a planogram that contains the SKU that will maximize a selected performance metric (referred to as "VPC" in FIGS. 15-18) in a given amount of space.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan) and then compiled and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer implemented method for determining a change of store space and for determining which of a plurality of products are to be added or eliminated, to achieve a desired impact on a selected store performance metric of interest, the computer implemented method comprising:

defining store performance metrics, comprising at least two of: a gross margin, an adjusted gross margin, a contribution margin and predicted sales;

clustering, by a hardware processor, stores, based on similarities in sales volume, and sales productivity per linear foot of facing of said stores to generate groups of stores comprising: a first group of stores with low sales per the linear foot of facing, a second group of stores with medium sales per the linear foot of facing, and a third group of stores with high sales per the linear foot of facing;

aggregating, by the hardware processor, the plurality of products into a plurality of product segments;

defining a plurality of planograms and further defining each of the plurality of product segments that apply to each of the plurality of planograms, based upon physical dimensions of each of the plurality of planograms and the plurality of products that comprise each of the plurality of product segments;

performing data preparation for curve fitting to generate a plurality of curve data sets based on every combination of:

performance metric of each of the defined store performance metrics, store cluster of each of the generated groups of stores, planogram of each of the plurality of planograms, and segment of each of the plurality of product segments, and once the data preparation for the curve fitting has been performed:

generating, by the hardware processor, space elasticity curves for the every combination of performance metric, store cluster, planogram and segment, and fitting, by a mathematical regression process, a space elasticity curve from the space elasticity curves into an S-shaped curve, when said space elasticity curve, out of all the space elasticity curves, follows a diminishing return under a Pareto type distribution;

scaling coefficients corresponding to the space elasticity curves;

selecting, by a user, at least one of the first group of stores, the second group of stores, and the third group of stores, the store performance metric of interest from the defined store performance metrics, planograms from the plurality of planograms, and product segments from the plurality of product segments;

retrieving, by the user, the scaled coefficients corresponding to the space elasticity curves, and selecting, by the user, the desired impact of the selected store performance metric of interest;

regenerating the space elasticity curves from the scaled coefficients corresponding to the space elasticity curves;

generating, by the hardware processor, systemic items from the regenerated space elasticity curves to determine, for each of the synthetic items, the store space expressed by the linear foot of facing impacting the selected store performance metric of interest;

sorting using the fitted space elasticity curve, the synthetic items across the plurality of selected product segments to further determine an optimum increase or decrease in the store space across the selected planograms and the selected product segments;

combining the synthetic items into synthetic planograms using space increments of the linear foot of facing defined by the user;

determining, for each of the synthetic planograms, a target number of the plurality of products in each of the selected product segments that impact the selected store performance metric of interest, and based on said target number of the plurality of products in each of the selected product segments:

determining, on an incremental basis, the optimum increase or decrease in the store space and which of the plurality of products are to be added or eliminated to achieve the desired impact on the selected store performance metric of interest to each of the selected planograms and the selected product segments.

2. The method of claim 1 further comprising:

adding the store space for the each of the synthetic items to calculate an average value across the selected at least one of the first group of stores, the second group of stores, and the third group of stores.

3. The method of claim 1 further comprising:

identifying, using standardized tables, a physical layout of the selected planograms.

4. The method of claim 3 further comprising:

updating the standardized tables on a monthly basis using a twelve month rolling average.

5. A system for determining a change of store space and for determining which of a plurality of products are to be added or eliminated to achieve a desired impact on a selected store performance metric of interest, the system comprising one or more hardware components and one or more hardware processors programmed to:

define store performance metrics, comprising at least two of: a gross margin, an adjusted gross margin, a contribution margin and predicted sales;

cluster stores, based on similarities in sales volume, and sales productivity per linear foot of facing of said stores to generate groups of stores comprising: a first group of stores with low sales per the linear foot of facing, a second group of stores with medium sales per the linear foot of facing, and a third group of stores with high sales per the linear foot of facing;

aggregate the plurality of products into a plurality of product segments;

define a plurality of planograms and further defining each of the plurality of product segments that apply to each of the plurality of planograms, based upon physical dimensions of each of the plurality of planograms and the plurality of products that comprise each of the plurality of product segments;

perform data preparation for curve fitting to generate a plurality of curve data sets based on every combination of:
  performance metric of each of the defined store performance metrics,
  store cluster of each of the generated groups of stores,
  planogram of each of the plurality of planograms, and
  segment of each of the plurality of product segments, and once the data preparation for the curve fitting has been performed:
generate, space elasticity curves for the every combination of performance metric, store cluster, planogram and segment, and
fit, by a mathematical regression process, a space elasticity curve from the space elasticity curves into an S-shaped curve, when said space elasticity curve, out of all the space elasticity curves, follows a diminishing return under a Pareto type distribution;
scale coefficients corresponding to the space elasticity curves;
select, by a user, at least one of the first group of stores, the second group of stores, and the third group of stores, the store performance metric of interest from the defined store performance metrics, planograms from the plurality of planograms, and product segments from the plurality of product segments;
retrieve, by the user, the scaled coefficients corresponding to the space elasticity curves, and selecting, by the user, the desired impact of the selected store performance metric of interest;
regenerate the space elasticity curves from the scaled coefficients corresponding to the space elasticity curves;
generate systemic items from the regenerated space elasticity curves to determine, for each of the synthetic items, the store space expressed by the linear foot of facing impacting the selected store performance metric of interest;
sort using the fitted space elasticity curve, the synthetic items across the plurality of selected product segments to further determine an optimum increase or decrease in the store space across the selected planograms and the selected product segments;
combine the synthetic items into synthetic planograms using space increments of the linear foot of facing defined by the user;
determine, for each of the synthetic planograms, a target number of the plurality of products in each of the selected product segments that impact the selected store performance metric of interest, and based on said target number of the plurality of products in each of the selected product segments:
determine, on an incremental basis, the optimum increase or decrease in the store space and which of the plurality of products are to be added or eliminated to achieve the desired impact on the selected store performance metric of interest to each of the selected planograms and the selected product segments.

6. The system of claim 5 wherein the one or more hardware components and the one or more hardware processors are further programmed to:

add the store space for the each of the synthetic items to calculate an average value across the selected at least one of the first group of stores, the second group of stores, and the third group of stores.

7. The system of claim 5 wherein the one or more hardware components and the one or more hardware processors are further programmed to:
  identify, using standardized tables, a physical layout of the selected planograms.

8. The system of claim 7 wherein the one or more hardware components and the one or more hardware processors are further programmed to:
  update the standardized tables on a monthly basis using a twelve month rolling average.

9. A non-transitory computer readable storage medium on which is recorded computer executable instructions that, when executed by a processor, cause the processor to execute the steps of a method for determining a change of store space and for determining which of a plurality of products are to be added or eliminated to achieve a desired impact on a selected store performance metric of interest, the steps of the method comprising:
  defining store performance metrics, comprising at least two of: a gross margin, an adjusted gross margin, a contribution margin and predicted sales;
  clustering, stores, based on similarities in sales volume, and sales productivity per linear foot of facing of said stores to generate groups of stores comprising: a first group of stores with low sales per the linear foot of facing, a second group of stores with medium sales per the linear foot of facing, and a third group of stores with high sales per the linear foot of facing;
  aggregating the plurality of products into a plurality of product segments;
  defining a plurality of planograms and further defining each of the plurality of product segments that apply to each of the plurality of planograms, based upon physical dimensions of each of the plurality of planograms and the plurality of products that comprise each of the plurality of product segments;
  performing data preparation for curve fitting to generate a plurality of curve data sets based on every combination of:
    performance metric of each of the defined store performance metrics,
    store cluster of each of the generated groups of stores,
    planogram of each of the plurality of planograms, and
    segment of each of the plurality of product segments, and once the data preparation for the curve fitting has been performed:
  generating, space elasticity curves for the every combination of performance metric, store cluster, planogram and segment, and
  fitting, by a mathematical regression process, a space elasticity curve from the space elasticity curves into an S-shaped curve, when said space elasticity curve, out of all the space elasticity curves, follows a diminishing return under a Pareto type distribution;
  scaling coefficients corresponding to the space elasticity curves;
  selecting, by a user, at least one of the first group of stores, the second group of stores, and the third group of stores, the store performance metric of interest from the defined store performance metrics, planograms from the plurality of planograms, and product segments from the plurality of product segments;

retrieving, by the user, the scaled coefficients corresponding to the space elasticity curves, and selecting, by the user, the desired impact of the selected store performance metric of interest;

regenerating the space elasticity curves from the scaled coefficients corresponding to the space elasticity curves;

generating, systemic items from the regenerated space elasticity curves to determine, for each of the synthetic items, the store space expressed by the linear foot of facing impacting the selected store performance metric of interest;

sorting using the fitted space elasticity curve, the synthetic items across the plurality of selected product segments to further determine an optimum increase or decrease in the store space across the selected planograms and the selected product segments;

combining the synthetic items into synthetic planograms using space increments of the linear foot of facing defined by the user;

determining, for each of the synthetic planograms, a target number of the plurality of products in each of the selected product segments that impact the selected store performance metric of interest, and based on said target number of the plurality of products in each of the selected product segments:

determining, on an incremental basis, the optimum increase or decrease in the store space and which of the plurality of products are to be added or eliminated to achieve the desired impact on the selected store performance metric of interest to each of the selected planograms and the selected product segments.

10. The non-transitory computer readable storage medium of claim 9 further comprising:

adding the store space for the each of the synthetic items to calculate an average value across the selected at least one of the first group of stores, the second group of stores, and the third group of stores.

11. The non-transitory computer readable storage medium of claim 9 further comprising:

identifying, using standardized tables, a physical layout of the selected planograms.

12. The non-transitory computer readable storage medium of claim 11 further comprising:

updating the standardized tables on a monthly basis using a twelve month rolling average.

\* \* \* \* \*